(12) United States Patent
Wakabayashi et al.

(10) Patent No.: US 7,054,800 B2
(45) Date of Patent: May 30, 2006

(54) ANALYSIS MODEL DATA CREATING METHOD AND APPARATUS, AND RECORDING MEDIUM HAVING ANALYSIS MODEL DATA CREATING PROGRAM RECORDED THERON

(75) Inventors: Masayasu Wakabayashi, Shizuoka (JP); Mitsugu Isomura, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 911 days.

(21) Appl. No.: 09/893,491

(22) Filed: Jun. 29, 2001

(65) Prior Publication Data

US 2002/0004713 A1    Jan. 10, 2002

(30) Foreign Application Priority Data

Jul. 5, 2000 (JP) .............................. 2000-203853

(51) Int. Cl.
*G06F 7/48* (2006.01)
*G06F 17/10* (2006.01)

(52) U.S. Cl. ............................................. 703/7; 703/2
(58) Field of Classification Search .................... 703/7, 703/2

See application file for complete search history.

(56) References Cited

U.S. PATENT DOCUMENTS 5,570,460 A * 10/1996 Ramanujam ................. 345/424
6,219,061 B1 * 4/2001 Lauer et al. ................. 345/424
6,405,151 B1 * 6/2002 Fujii et al. ................... 702/155

OTHER PUBLICATIONS

Full English language translation of a Japanese language article by Torigaki et al., entitled "Automatic Generation of Numerical Analysis Models Using Voxels And Its Application to Structural Analysis and Topology Shape-Optimization" (" Automatic Generation of a Numerical Analysis Model Using a Voxel Model, and Its Application to Structural Analysis and Phase Shape Optimal Design"), Collection of Lecture Thesis(I) 74th General Meeting of the Japan Machinery Society.

A Japanese-language article by Torigaki et al., entitled "Automatic Generation of a Numerical Analysis Model Using a Voxel Model, and Its Application to Structural Analysis and Topology Shape Optimization", Collection of Lecture Thesis (I) 74th General Meeting of the Japan Machinery Society.

* cited by examiner

*Primary Examiner*—Paul L. Rodriguez
*Assistant Examiner*—Dwin M. Craig
(74) *Attorney, Agent, or Firm*—Greenblum & Bernstein, P.L.C.

(57) ABSTRACT

According to the present invention, even if an analysis target has a complicated shape, for example, two or more cutting surfaces, elements can be automatically extracted therefrom without reducing any analysis accuracy. For each voxel interfering with shape data, an interference polygon is created inside the shape data using interference surfaces between the shape data and the interior of the voxel. After the interference polygon is created, a divided polygon is created by moving one of the vertexes of the interference polygon, which has a predetermined property, to another vertex. The divided polygon includes the vertex that has not been moved and vertexes of the voxel inside the shape data. An element of a predetermined shape is extracted on the basis of the relationship between a plurality of vertexes of the divided polygon.

14 Claims, 29 Drawing Sheets

SHAPE DATA
1 VOXEL

INTERNAL VOXEL SURFACE 3B
ON-SIDE INTERSECTION 6A
INTERFERENCE SURFACE 3A
3 INTERFERENCE POLYGON

7A DIVIDED POLYGON 4

7A
5 ELEMENT

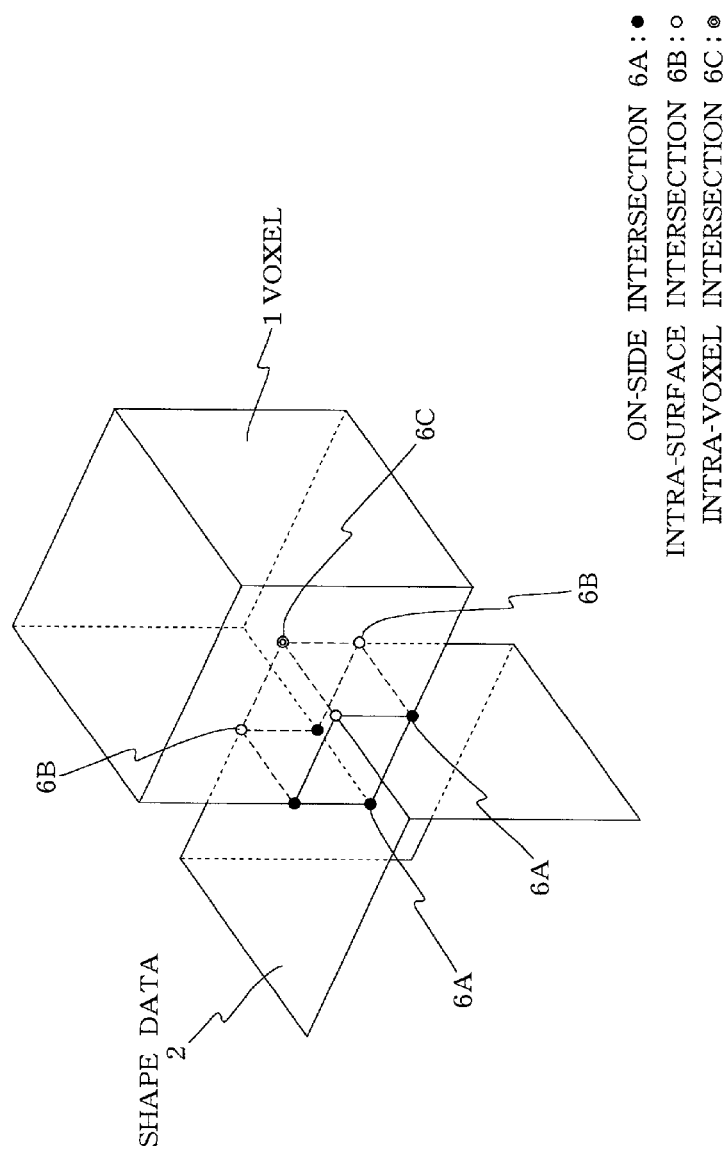

INTERFERENCE SURFACE

INTERNAL VOXEL SURFACE

INTERFERENCE POLYGON 3

ONLY ON-SIDE
INTERSECTIONS

INTRA-SURFACE
INTERSECTIONS
INCLUDED

SHAPE OF THE SHAPE
DATA INSIDE THE VOXEL

○ : ON-SIDE INTERSECTION
● : INTRA-SURFACE INTERSECTION

CONTRACTION DISTANCE (———) : VOXEL
(----) : INTERFERENCE POLYGON

SOLID LINE (———) : INTERFERENCE POLYGON
BLACK CIRCLE ( ● ) : SOURCE VERTEX 6A
WHITE CIRCLE ( ○ ) : DESTINATION VERTEX 11A

THICK SOLID LINE (———): SIDE DATA
THICK BROKEN LINE (----): DIAGONAL DATA

FIG.15(B) PAIR DATA LIST

| PAIR NUMBER | BOTTOM SURFACE CONSTITUTING DATA | TOP SURFACE CONSTITUTING DATA | |
|---|---|---|---|
| 1 | B1 | NONE | |
| 2 | B2 | T1 | ←PAIR |
| 3 | B3 | T2 | ←PAIR |
| 4 | B4 | T3 | ←PAIR |
| 5 | B5 | NONE | |

FIG.15(C) PAIR DATA LIST

| PAIR NUMBER | BOTTOM SURFACE CONSTITUTING DATA | TOP SURFACE CONSTITUTING DATA | |
|---|---|---|---|
| 1 | B1 | T1 | ←PAIR |
| 2 | B2 | T1 | ←PAIR |
| 3 | B3 | T2 | ←PAIR |
| 4 | B4 | T3 | ←PAIR |
| 5 | B5 | T3 | ←PAIR |

PAIR DATA LIST

| PAIR NUMBER | BOTTOM SURFACE CONSTITUTING DATA | TOP SURFACE CONSTITUTING DATA |
|---|---|---|
| 1 | B1 | T1 |
| 2 | B2 | P1 → T2 |
| 3 | B3 | T2 → T3 |
| 4 | B4 | T3 → T4 |
| 5 | P4 → B5 | T4 → T5 |
| 6 | B5 → B6 | T5 → T6 |
| 7 | P3 → B7 | T6 → T7 |
| 8 | B6 → B8 | P2 → T8 |

PAIR DATA LIST

| PAIR NUMBER | BOTTOM SURFACE CONSTITUTING DATA | TOP SURFACE CONSTITUTING DATA |
|---|---|---|
| 1 | A | |
| 2 | B | |
| 3 | C | |
| 4 | D | |
| 5 | E | |
| 6 | F | |
| 7 | | I |
| 8 | G | J |
| 9 | | K |

FIG.18(A)

PAIR DATA LIST

| PAIR NUMBER | BOTTOM SURFACE CONSTITUTING DATA | TOP SURFACE CONSTITUTING DATA |
|---|---|---|
| 1 | A | H |
| 2 | B | |
| 3 | C | |
| 4 | D | |
| 5 | E | |
| 6 | F | I |
| 7 | G | J |

FIG.18(B)

PAIR DATA LIST

| PAIR NUMBER | BOTTOM SURFACE CONSTITUTING DATA | TOP SURFACE CONSTITUTING DATA |
|---|---|---|
| 1 | A | H ⎫ |
| 2 | B | H ⎬-21 ⎫-22 |
| 3 | C | H ⎭ |
| 4 | D | I ⎫ |
| 5 | E | I ⎬-21 ⎫-22 |
| 6 | F | I ⎭ |
| 7 | G | J |

HEXAHEDRON
COMPOSED SIX
RECTANGLES

PENTAHEDRON
COMPOSED OF
TWO TRIANGLES
AND THREE
RECTANGLES

TETRAHEDRON
COMPOSED OF
FOUR TRIANGLES

HEXAHEDRON

○ : VERTEXES FROM SIDE DATA OF
    TOP SURFACE CONSTITUTING DATA

□ : VERTEXES FROM SIDE DATA OF
    BOTTOM SURFACE CONSTITUTING DATA

○ : VERTEXES FROM SIDE DATA OF
   TOP SURFACE CONSTITUTING DATA

□ : VERTEXES FROM SIDE DATA OF
   BOTTOM SURFACE CONSTITUTING DATA

■ : POINTS WHERE VERTEX FROM SIDE DATA OF
   TOP SURFACE CONSTITUTING DATA IS SAME
   AS VERTEX FROM SIDE DATA OF
   BOTTOM SURFACE CONSTITUTING DATA

ADD A DIAGONAL TO POLYGON TO DIVIDE INTO TWO TETRAHEDRONS

○: VERTEXES FROM SIDE DATA OF TOP SURFACE CONSTITUTING DATA

□: VERTEXES FROM SIDE DATA OF BOTTOM SURFACE CONSTITUTING DATA

■: POINTS WHERE VERTEX FROM SIDE DATA OF TOP SURFACE CONSTITUTING DATA IS SAME AS VERTEX FROM SIDE DATA OF BOTTOM SURFACE CONSTITUTING DATA

FIG.22(A)
FIG.22(B)
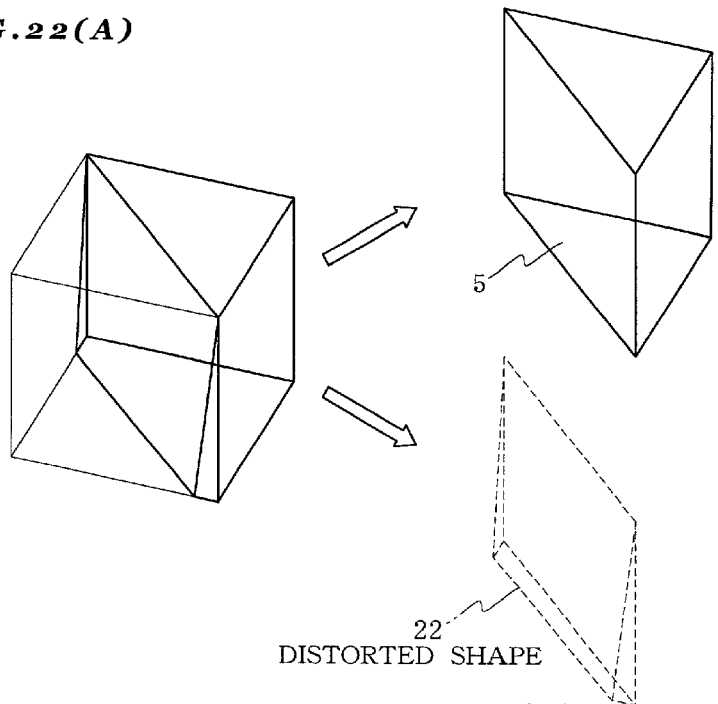
22
DISTORTED SHAPE
FIG.22(C)
FIG.22(D)
FIG.22(E)
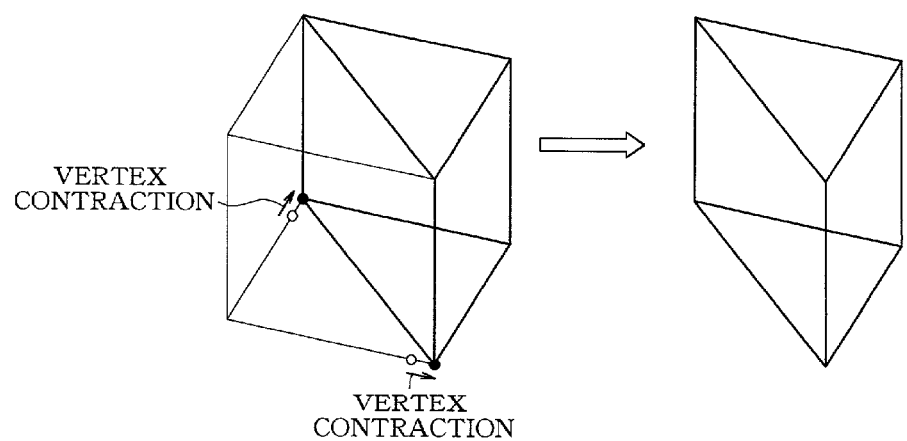
VERTEX CONTRACTION
VERTEX CONTRACTION

FIG. 25

RESULTS OF APPLICATION OF PRESENT SYSTEM TO CONNECTING ROD

| ANALYSIS MODEL CREATING METHOD | TIME REQUIRED TO CREATE THE SYSTEM [HOUR] | NUMBER OF ELEMENTS | PRIMARY SPECIFIC FREQUENCY [Hz] | DIFFERENCES FROM EXPERIMENTAL VALUES [Hz] |
|---|---|---|---|---|
| EXPERIMENTAL VALUES | / | / | 3535.2 | / |
| PRESENT SYSTEM | 4.2 | 16383 | 3554.6 | +19.5 (+0.55%) |
| CONVENTIONAL METHOD (DIVISION OF TETRAHEDRON USING I-DEAS(TM)) | 4.3 | 37131 | 3187.6 | -347.6 (-9.83%) |

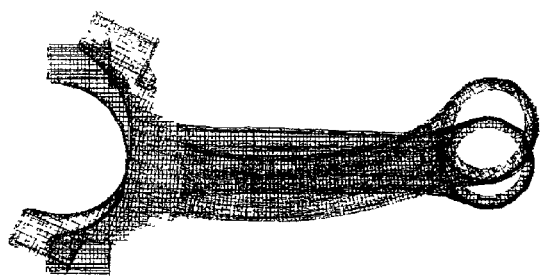
FIG.26(A) RESULTS OF ANALYSIS OF ANALYSIS MODEL CREATED USING CONVENTIONAL METHOD (I-DEAS(TM))
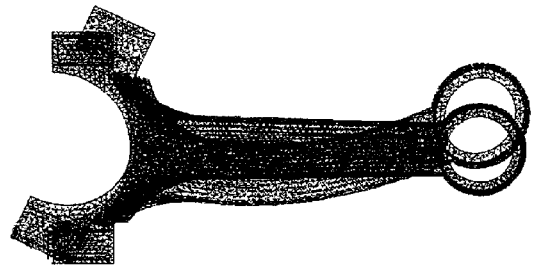
FIG.26(B) RESULTS OF ANALYSIS OF ANALYSIS MODEL CREATED USING PRESENT SYSTEM

ANALYSIS MODEL DATA
(NO SHAPE FITTING)

ANALYSIS MODEL DATA
(WITH SHAPE FITTING)

FIG. 29  RESULTS OF APPLICATION OF PRESENT SYSTEM TO CYLINDER BLOCK

| ANALYSIS MODEL CREATING METHOD | TIME REQUIRED TO CREATE SYSTEM [HOUR] | PRIMARY SPECIFIC FREQUENCY [Hz] | DIFFERENCES FROM EXPERIMENTAL VALUES [Hz] |
|---|---|---|---|
| EXPERIMENTAL VALUES | / | 507.8 | / |
| PRESENT SYSTEM (WITH SHAPE FITTING) | 0.25 | 467.9 | −39.9 (−7.9%) |
| PRESENT SYSTEM (WITHOUT SHAPE FITTING) | 0.25 | 625.1 | +117.3 (+23.1%) |
| CONVENTIONAL METHOD (DIVISION OF TETRAHEDRON USING I-DEAS(TM)) | 400 | 447.4 | −60.4 (−11.9%) |

ANALYSIS MODEL DATA CREATING METHOD AND APPARATUS, AND RECORDING MEDIUM HAVING ANALYSIS MODEL DATA CREATING PROGRAM RECORDED THERON

BACKGROUND OF THE INVENTION

1. Field of the Invention

The present invention relates to a method and apparatus for creating an analysis model, and in particular, to a method and apparatus for creating analysis model data suitable for structural or fluid analysis. The present invention also relates to a program for creating an analysis model or a storage medium in which this program is recorded.

2. Description of the Prior Art

Conventionally, to create a three-dimensional shape model, elements from three-dimensional CAD data are generally divided to create an analysis model. With a complicated model, the number of steps required to form a model is huge and these steps require advanced techniques. A method utilizing voxels (volume pixels) has been proposed as one for automatically creating a solid model (hexahedron model). Voxel data define a three-dimensional model with a set of cubes utilizing three-dimensional rectangular coordinates, and the "voxels" are a concept corresponding to pixels in two dimensions. It is easy to completely automatically create FEM elements (analysis model data) from a three-dimensional model.

In this conventional example, however, since the voxel data are based on the rectangular coordinates, a very large number of divisions are required to accurately represent shape data, resulting in a huge number of elements. When, for example, a cube of 100 mm side is divided using 1-mm voxels, one million elements result. On the other hand, when the size of one element of the voxel is increased, the analysis accuracy decreases in calculations for deformation under loads and maximum stress in a location where stress is concentrated.

For example, Toshikazu TORIGAMI et al., "Automatic Generation of a Numerical Analysis Model Using a Voxel Model, and Its Application to Structural Analysis and Phase Shape Optimal Design", Collection of Lecture Theses (I) Presented at the 74-th General Meeting of the Japan Machinery Society discloses that 64,333,160 voxel models are created for a mission case of a vehicle and that 7,063,070 nodes result. This conventional example states that a special analysis solver was also developed probably because the number of elements exceeded that which can be analyzed by normal analysis solvers and that when a super computer was used to provide a load transmitted from a bearing to a shaft and determine the distribution of this load, the analysis required about 18 hours.

If the results of the structural or fluid analysis of a mission case or a cylinder block that has a complicated shape are to be utilized to determine an optimal shape for reducing the weight of the cylinder block or the like while maintaining its required rigidity, the above-described example requires a special analysis solver and a large amount of time for calculations, thereby requiring high costs for simulations.

BRIEF SUMMARY OF THE INVENTION

Object of the Invention

It is an object of the present invention to provide a method for creating an analysis model which eliminates the disadvantages of the conventional example and which can particularly automate the division of shape data into elements while reducing the number of elements without degrading the analysis accuracy even if an analysis target has a complicated shape.

It is another object of the present invention to provide a program for generating such an analysis model.

SUMMARY OF THE INVENTION

Thus, the present invention provides an analysis model data creating method for creating an analysis model data using an arithmetic device, including: a shape data readout step of reading out shaped at a defining a surface shape of an analysis target; a voxel data generating step of generating voxel data in which the shape data read out at the shape data readout step are embraced by a set of voxels that are rectangular parallellopiped; and an interference polygon creating step of creating, for each voxel interfering with the shape data readout at the shape data readout step, an interference polygon inside the shape data using interference surfaces between the shape data and the interior of the voxel.

Furthermore, the present method further includes: after the interference polygon creating step, a divided polygon creating step of moving one of the vertexes of the interference polygon which has a predetermined property, to another vertex and creating a divided polygon having as vertexes the vertex that has not been moved and vertexes of the voxel inside the shape data; and an element extracting step of extracting an element of a predetermined shape on the basis of a relationship between a plurality of vertexes of the divided polygon created at the divided polygon creating step. This configuration is used to attain the above described objects.

The voxel data generating step comprises executing a process such as the division of the shape data to generate voxel data representing the external shape of the shape data using voxels. Subsequently, at the interference polygon creating step, for each voxel interfering with the shape data, an interference polygon is created inside the shape data using interference surfaces between the shape data and the interior of the voxel. The voxel interfering with the shape data contains a boundary between the inside and outside of the shape data. How the shape data interfere with the voxel depends on the appearance of the shape data. At the interference polygon creating step, boundary surfaces from the shape data which are present inside the voxel are defined as interference surfaces. This interference surfaces enable the shape of the voxel to match the shape data.

The shape of the interference polygon is such that when planes cutting the voxel are assumed to be cutting planes, the number of cutting planes is assumed to range from 1 to an infinite number dependent on the resolution of the coordinates. Thus, when an attempt is made to determine the elements of the analysis model directly on the basis of the interference polygon, the number of elements is infinite, thus diverging the processing. Further, if the number of cutting planes for the voxel, which is rectangular parallellopiped, is limited to one, the shape generated by the one cutting plane can be identified beforehand. If, however, any voxel is assumed to have two or more cutting planes, all the shapes that can be generated cannot be identified. Thus, if any voxel has two or more cutting planes, it is difficult to redefine the interference polygon of this voxel as an element of a particular shape.

According to the present invention, the divided polygon creating step comprises one of the vertexes of the interference polygon which has a predetermined property, to another vertex. This eliminates the vertex of the interference polygon which has the predetermined property, while leaving only the vertexes having other properties. Consequently, however the voxel and the interference polygon interfere with each other, the shape of the interference polygon is relatively easy to handle. At the divided polygon creating step, a divided polygon is created which has as vertexes the one not having the particular property and the vertex of the voxel inside the shape data.

For example, in a preferred embodiment, a vertex floating inside the voxel (intra-voxel vertex) or a vertex located on a surface of the voxel (on-surface vertex) is moved to a vertex on a side (on-side vertex). The movement of the vertex having the predetermined property simplifies the shape of the interference polygon. For structural analysis, this simplification preferably comprises scraping-off or addition in order to allow the interference polygon to have a simpler shape. Further, if, for example, the number sides sharing this vertex of the divided polygon exceeds a predetermined number, the divided polygon may be created by moving a vertex constituting the other end of the above vertex, to another vertex.

Once the shape of the interference polygon is simplified and the divided polygon is generated, then at the element extracting step, a predetermined shape of elements are extracted on the basis of the relationship between the plurality of vertexes of the divided polygon. For example, a certain vertex is focused on and a tetrahedron or a hexahedron is extracted on the basis of the relationship between a side containing that vertex and another side. Then, the divided polygon can be divided into elements by cutting off elements and sequentially extracting them. If, for example, a vertex both of the voxel and of the divided polygon is focused on and three sides are connected to this vertex, a tetrahedron formed around this vertex of the voxel and having triangular bases and four sides can be extracted. If two vertexes of the voxel also constitute vertexes of the divided polygon, an attempt is made to extract a hexahedron or pentahedron.

In the preferred embodiment, the element extraction process is executed such that when a certain surface of the divided polygon is defined as a base, elements are extracted using a plane which is perpendicular to this base and which contains two or three vertexes of the divided polygon, thereby reducing the number of voxels that cannot be processed (the state in which elements cannot be properly extracted at the element extracting step).

Since the divided polygon creating step comprises generating the divided polygon with the simplified interference polygon and the element extracting step comprises extracting elements on the basis of the plurality of vertexes of this divided polygon, the shape of the divided polygon can be simplified depending on the element extracting method, thus enabling the process to be completed without divergence even if one voxel has two or more interference surfaces. Further, if, for example, the vertexes of the divided polygon are limited to points on sides of the voxel, then at the element extracting step, for example, a plane perpendicular to a base that is one surface of the divided polygon can be defined on the basis of the relationship between the plurality of vertexes of the divided polygon, so that this plane and each vertex can be used to extract elements of simple shapes.

BRIEF DESCRIPTION OF THE DRAWINGS

FIG. 2 is an explanatory representation showing an example of data for use in a flow chart in FIG. 1.

FIG. 5 is an explanatory representation showing an example of intersections for use in the process shown in FIG. 4;

FIG. 6 is an explanatory representation illustrating an interior and exterior determining value for use in a process shown in FIG. 4.

FIG. 7 is an explanatory representation showing an example of an interference polygon created by the process shown in FIG. 4.

FIG. 8 is an explanatory representation showing an example of determination of the front and back of an interference surface containing intra-surface intersections (and intra-voxel intersections)

FIG. 10 is an explanatory representation showing a specific example of a process shown in FIG. 9.

FIG. 12 is an explanatory representation showing an example of a divided polygon for use in the process shown in FIG. 11.

FIG. 15 is an explanatory representation showing how pair data are handled during the extraction preprocess shown in FIG. 14, FIG. 15(B) is a chart showing an example of a pair data list in initial conditions, and FIG. 15(C) is a chart showing an example of the pair data list as obtained after pair have been generated;

FIG. 16 is an explanatory representation showing how pair data containing projective points are handled during the extraction preprocess shown in FIG. 14.

FIG. 17 is an explanatory representation showing how pair data containing a pair leading from the same vertex to a plurality of vertexes are handled during the extraction preprocess shown in FIG. 14.

FIG. 18 is an explanatory representation showing an example of a process for manipulating the pair data shown in FIG. 17 to identify pairs, FIG. 18(A) is a chart showing that a process for identifying a first pair has been executed, and FIG. 18(B) is a chart showing that a process for identifying a second and third pairs has been executed;

FIG. 19 is an explanatory representation useful in explaining a specific example of the extraction process shown in FIG. 3 and other drawings.

FIG. 22 is an explanatory representation showing an example of a vertex contacting process executed if the shape of an element to be extracted is distorted, FIG. 22(A) is a view showing an example of a divided polygon containing a distorted portion, FIG. 22(B) is a view showing an example of a normally extracted element, FIG. 22(C) is a view showing an example of an element that is not extracted due to its distorted shape, FIG. 22(D) is a view showing an example of vertex contraction for excluding this distorted element, and FIG. 22(E) is a view showing an example in which the element has been extracted from the divided polygon subjected to the vertex contraction;

FIG. 25 is a chart showing results of the application, to a connection rod, of the analysis model data creating apparatus according to the present invention;

FIG. 26 is an explanatory representation showing examples of results of the analysis of the connecting rod shown in FIG. 25, FIG. 26(A) is a view showing results of the analysis in a conventional example, and FIG. 26(B) is a view showing results of the analysis in this example;

FIG. 27 is an explanatory representation showing an example of analysis model data in which shape fitting is not executed on the voxels.

FIG. 28 is an explanatory representation showing an example of analysis model data for which shape fitting is executed according to this embodiment, FIG. 29 is a chart showing results of the application, to a cylinder block, of the analysis model data according to this embodiment.

DETAILED DESCRIPTION OF THE PREFERRED EMBODIMENTS

Figure 1:
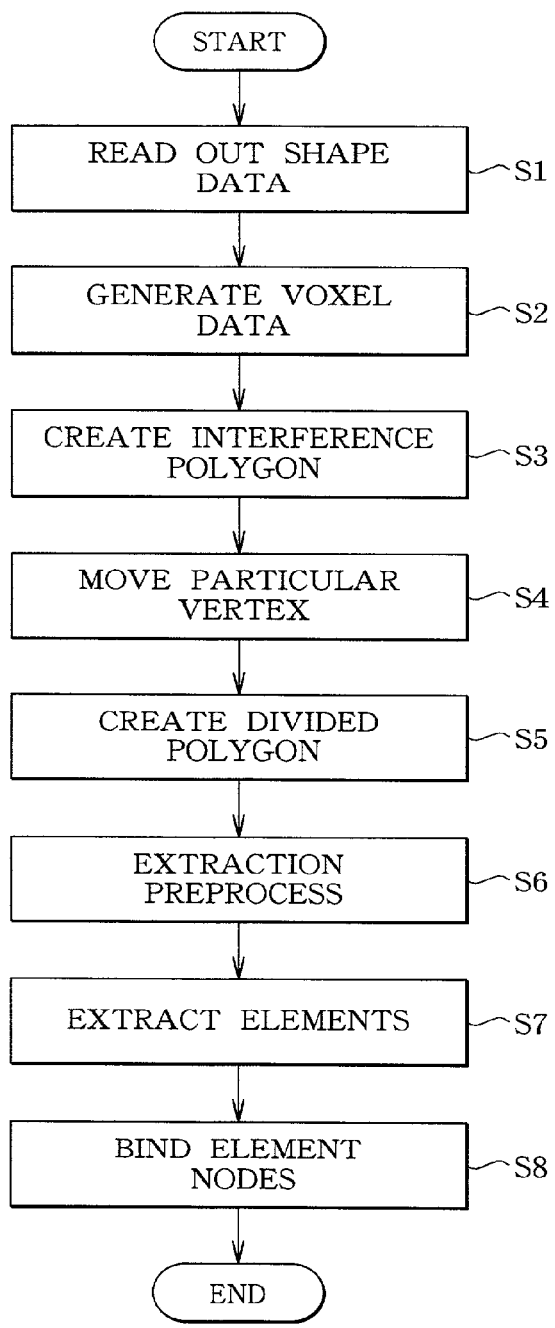
FIG. 1 is a flow chart showing an example of a configuration of one embodiment of the present invention.

FIG. 1 is a flowchart showing an example of a configuration of one embodiment of the present invention. In an analysis model data creating method according to this embodiment, analysis model data are created from shape data such as CAD or STL data using an arithmetic device such as a computer. The analysis model data are a set of the elements of a shape that can be handled by an analysis solver (software for executing structural analysis or the like), and represent the shape of the shape data. The analysis solver executes structural analysis such as the determination of the specific frequency of the shape or stress analysis. Further, the analysis model data created according to this embodiment can be used as inputs to an analysis solver for fluid analysis.

As shown in FIG. 1, the analysis model data creating method according to this embodiment comprises a shape data readout step S1 of reading out shape data 2 defining a surface shape of an analysis target, a voxel data generating step S2 of generating voxel data in which the shape data 2 read out at the shape data readout step S1 are embraced by a set of voxels 1 that are rectangular parallellopiped, and an interference polygon creating step S3 of creating, for each voxel interfering with the shape data 2 read out at the shape data readout step S1, an interference polygon 3 inside the shape data 2 using interference surfaces 3A between the shape data 2 and the interior of the voxel 1.

The present method further comprising, after the interference polygon creating step S3, a divided polygon creating step S5 of moving one of the vertexes of the interference polygon 3 which has a predetermined property, to another vertex and creating a divided polygon 4 having as vertexes the vertex that has not been moved and vertexes of the voxel 1 inside the shape data 2; and an element extracting step S7 of extracting an element 5 of a predetermined shape on the basis of a relationship between a plurality of vertexes of the divided polygon 4 created at the divided polygon creating step S5. After the element has been extracted, it may be converted into an octotree structure or nodes of the element may be bound.

FIG. 2 is an explanatory representation showing an example of data used in the flow chart shown in FIG. 1. FIG. 2(A) shows an example of the voxel 1 interfering with the shape data 2. The voxel 1 is a rectangular parallellopiped having predetermined side lengths. The voxel 1 may be created by dividing the shape data 2 read out at the shape data readout step S1 or voxel data may be generated on the basis of the external shape of the shape data 2. When the voxel data are generated, the voxel (voxel to be processed) 1 interfering with the shape data 2 is identified.

Figure 2A:
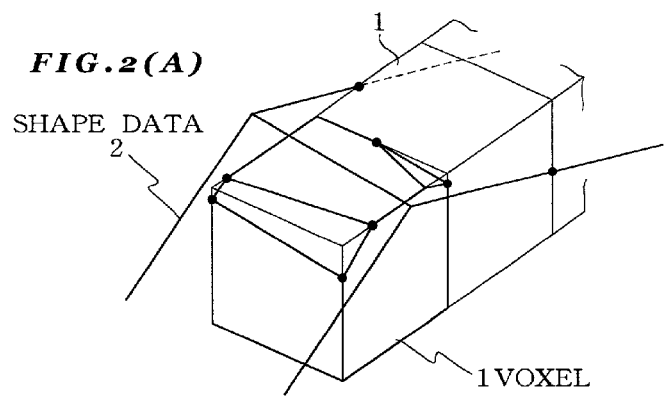
FIG. 2(A) is a view showing an example of voxel data interfering with shape data.
Figure 2B:
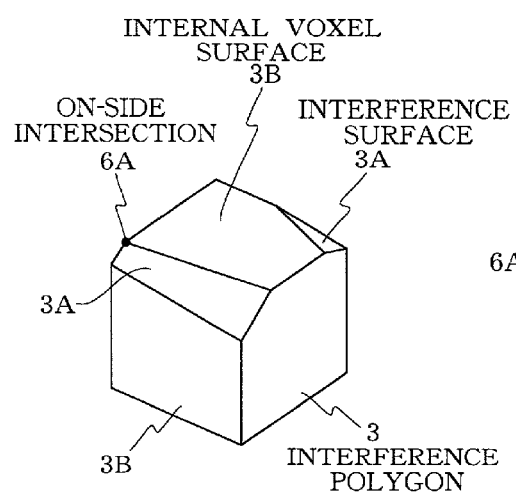
FIG. 2(B) is a view showing an example of an interference polygon.

When the voxel 1 and the shape data 2 are interfering with each other, the voxel 1 is separated into an area inside the shape data 2 and an area outside the shape data 2, as shown in FIG. 2(A). The surface denoted by reference 3A in FIG. 2(B) is that from the shape data 2 which is present inside the processed voxel 1. The surfaces 3A are called "interference surfaces". The surfaces denoted by reference 3B are those of the voxel which are present inside the shape data 2. The surfaces 3B is called "internal voxel surfaces". If a voxel surface does not share any side of the interference surface 3A but is present inside the shape data, it is also called the "internal voxel surface 3B".

As shown in FIG. 2(B), the internal voxel surfaces 3B and the interference surfaces 3A define the interference polygon 3. The interference polygon 3 has one of various shapes depending on the shape of shape data 2. If no assumption can be made for the shape, the element 5 of an analysis model cannot be easily obtained or cut out therefrom.

Thus, in the example shown in FIG. 1, the divided polygon 4 having a further limited shape is generated from the interference polygon 3. At the divided polygon creating step S5, one of the vertexes of the interference polygon 3, which has a predetermined property is moved to another vertex (step S4), and a divided polygon having as vertexes the vertex that has not been moved and vertexes of the voxel inside the shape data is created. For example, a vertex having another vertex close thereto (in the example shown in FIG. 2, the one denoted by reference 6A) is defied as the one having a predetermined property and moved to another vertex for merging. This limits and simplifies the shape. For example, thin elements are eliminated by selecting one of two closely arranged vertexes as the one having a predetermined property. Further, in the preferred embodiment, the divided polygon 4 may be generated using only the vertexes on sides of the voxel.

At the element extracting step S7, the element 5 of the predetermined shape is extracted on the basis of the relationship between the plurality of vertexes of the divided polygon 4 created at the divided polygon creating step S5. The relationship between the vertexes is such that, for example, a vertex shares a side with another vertex or the arrangement relationship between the vertexes on one surface is the same as that for the vertexes on the opposite surface. Since the shape of the divided polygon 4 is limited at the divided polygon creating step S5 and the element is subsequently extracted using the relationship between the vertexes of the divided polygon at the element extracting step S7, the relationships between the vertexes can be classified in advance so that the element of the predetermined shape can be extracted depending on this classification.

One preferred method for stabilizing the element extracting process is to form the vertexes of the divided polygon 4, of vertexes on sides of the voxel 1 (on-side vertexes) In this case, since all the vertexes are located on sides of the voxel 1, the relationship between the vertexes can be determined more easily. In this example, the divided polygon creating step S5 includes a particular-vertex moving step S4 of moving a vertex of the interference polygon 3 which is not located on any side of the voxel 1 to an on-side intersection between the interference surface 3A and a side of the voxel 1. Specifically, a vertex of the interference polygon 3 which is present in a surface of the voxel 1 (intra-voxel intersection 6C) or the intersection of a side of the interference polygon 3 which is present in a surface of the voxel 1 (intra-surface intersection 6B) is defined as an intersection having a predetermined property and is moved to an on-side intersection 6A for integration. This makes is possible to generate shape data having such a shape that at least one of the values of the three-dimensional coordinates of the vertexes of the divided polygon 4 is present in any voxel side. Removing the intra-surface intersection 6B allows the continuity of the interference surface 3A with the adjacent voxel 1 to be easily maintained, thereby reducing the possibility that the surface of the element is discontinuous between the adjacent voxels 1.

Figure 2C:
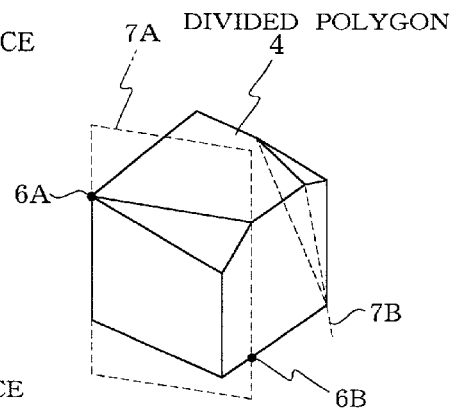
FIG. 2(C) is a view showing an example of a divided polygon.
Figure 2D:
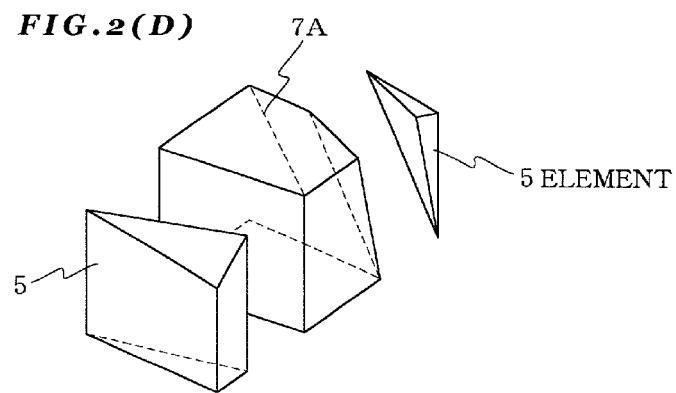
FIG. 2(D) is a view showing an example of elements input an analysis solver.

Further, the element extracting step S7 may include an extraction preprocess step of defining, for element extraction, lines between the vertexes of the divided polygon 4 and a surface of the divided polygon 4 which contains some of the vertexes and which is parallel with any of the voxel surfaces. For example, FIG. 2(C) shows a plane 7A for element extraction. The plane 7A contains the three on-side vertexes 6A and the vertex 6B. The plane 7A is also perpendicular to the voxel surface constituting the base in the figure. The process of extracting the element using the plane which is perpendicular to the voxel surface containing the base and which contains the vertex 6B and the normal vertexes 6A can be relatively stably applied to complicated divided polygons 4 to hinder the element extracting process from being divergent.

The vertex 6B is defined at a location on a side of the internal voxel surface which location has an on-side vertex on the corresponding side perpendicular to the base. When the vertex 6B (in the embodiment, a projective point) is defined at this location and the element is extracted using the predetermined plane 7A, a divided polygon of a complicated shaped can be divided into elements of simple shapes. Further, when the side 7B in FIG. 2(C) is focused on and the arrangement of the vertexes relating to this side is considered, the shape can be determined, and in this case, the element 5 can be extracted using only the relationship between the vertexes.

In the preferred embodiment, the vertexes of the divided voxel are divided into the top and bottom surface sides of the voxel, the correspondences between the vertexes on the top and bottom surfaces are determined as pairs. During this paring step, pairs of the projective point 6B and the normal intersections are generated in accordance with predetermined conditions. An element of a predetermined shape is then extracted on the basis of information indicating whether the vertex belongs to the top surface side or the bottom surface side, and of the projective points and the arrangement relationship between the projective points or vertexes.

In this case, the element extracting step S7 shown in FIG. 1 comprises a top and bottom surface setting step of setting, for the divided polygon, a bottom surface and a top surface corresponding to the bottom surface, a vertex allotting step of allotting the vertexes of the divided polygon to the top surface side and bottom surface side set at the top and bottom surface setting step, a top and bottom surface vertex pair identifying step of identifying the correspondences between the vertexes on the top and bottom surface sides which have been allotted at the vertex allotting step, and a pair-used extracting step of extracting an element of a predetermined shape from the divided polygon using the top and bottom surface pairs identified at the top and bottom surface vertex pair identifying step. To set the top and bottom surfaces and determine the pairs, the intra-surface or intra-voxel intersection of the interference polygon is preferably moved to the on-side intersection.

Figure 3:
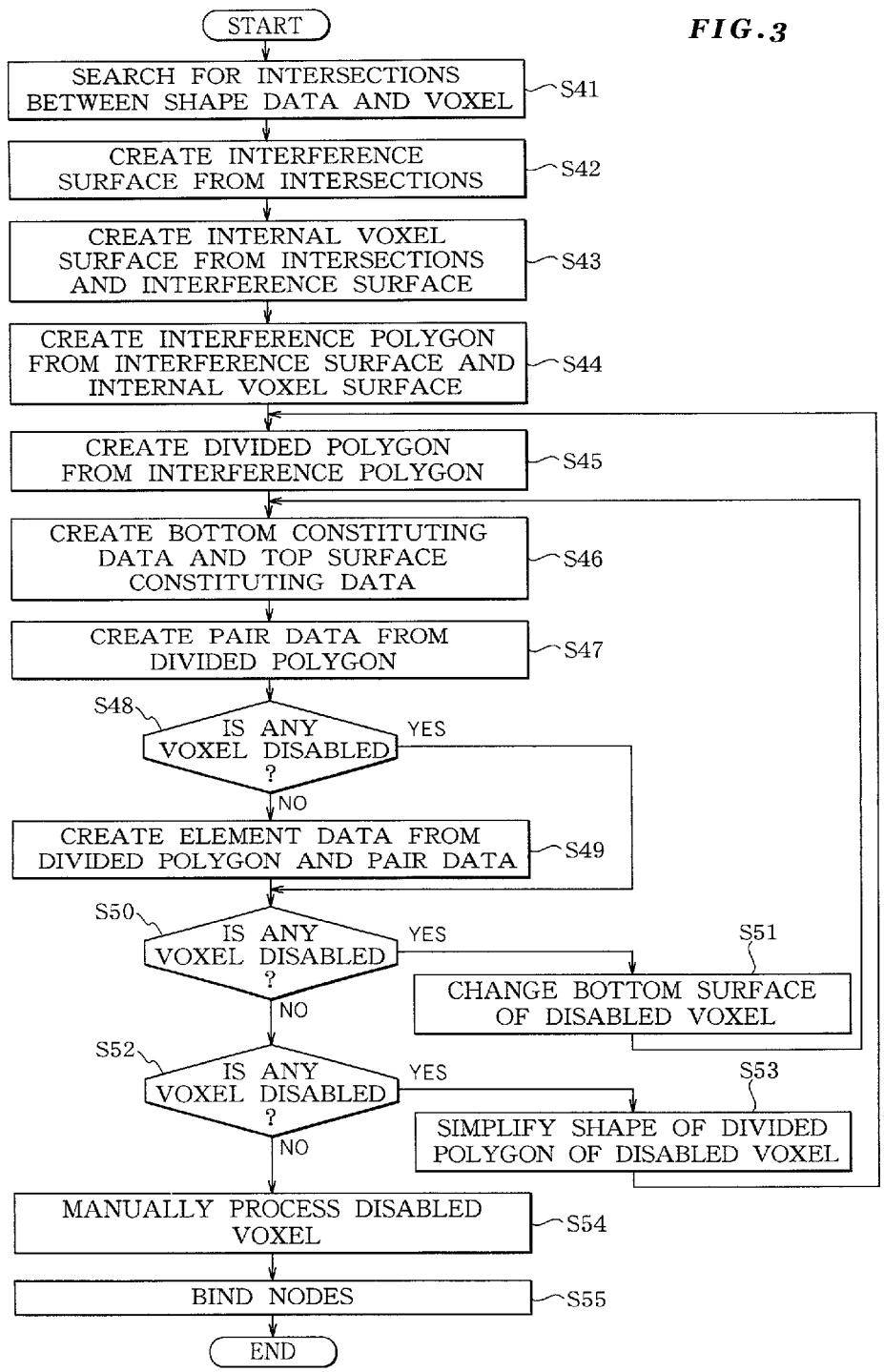
FIG. 3 is a flow chart showing an example of an entire configuration of an example of the present invention.

FIG. 3 is a flow chart showing a process for an analysis model creating method according to an example of the present invention. The analysis model creating method according to this example comprises, after the shape data readout step and voxel data generating step shown in FIG. 1, an interference polygon creating step (S41 to S44) of creating, for each voxel interfering with the shape data, the interference polygon 3 inside the shape data 2 using the interference surfaces 3A between the shape data 2 and the interior of the voxel 1.

The interference polygon creating step (S41 to S44) comprises an intersection retrieving step (step S41) of retrieving the intersections 6 between the shape data 2 and the voxel 1, an interference surface creating step (step S42) of creating the interference surfaces 3A from the retrieved intersections 6, an internal-voxel-surface creating step (step S43) of creating the internal voxel surfaces 3B from the intersections 6 and the interference surfaces 3A, and a step (S44) of creating an interference polygon from the interference surfaces and the internal voxel surfaces.

This example comprises, after step S44, a divided polygon creating step S45 of moving the vertexes 6B and 6C of the interference polygon 3 which are not located on any side of the voxel, to the on-side intersection 6A that is an intersection between the interference surface 3A and a side of the voxel 1, and creating the divided polygon 4 having as vertexes the on-side intersection 6A and vertexes of the voxel 1 inside the shape data 2. If any voxel cannot be processed, the shape of the divided polygon is further simplified (step S53), and the divided polygon creating step S45 is reexecuted.

This embodiment further comprises an element extracting step (S46 to S52) of extracting an element of a predetermined shape using a plurality of vertexes of the divided polygon 4 created at the divided polygon creating step S45 and a voxel surface inside the shape data 2 or a plane which is perpendicular to the internal voxel surface 3B, a partial area of the voxel surface, and which contains the vertexes. Then, the user is urged to manually process voxels that cannot be processed (step S54), and the nodes of the extracted element are bound (step S55).

The element extracting step is actually divided into an extraction preprocess step and an element extracting step S49. In the example shown in FIG. 3, the extraction preprocess step comprises a top and bottom surface configuration data 14 creating step (step S46) of creating bottom surface configuration data 14 and top surface configuration data 15 from the divided polygon 4, and a pair data creating step (step S47) of creating pair data for the vertexes of the divided polygon 4 with reference to the top and bottom surface configuration data 14.

At step S49, element data are created on the basis of the divided polygon 14 and the created pair data. If the divided polygon 4 does not allow pair data to be created, the bottom surface 12, acting as a reference for allotting the vertexes to the top and bottom surfaces, is changed. Further, if the divided polygon 4 does not allow element data to be created, the bottom surface 12 is changed. After six types of bottom surfaces have been tried and if any voxel still cannot be processed (step S52), then the outer vertexes of the divided polygon 4 are excluded, a simplification process for cutting off the outside of the divided polygon 4 or adding elements thereto is executed, and then the extraction preprocess is executed again (step S53). At this step S53, a contraction distance 10 is actually changed.

Steps shown in FIG. 3 will be described below in detail.

<Interference Polygon Creating Process>

The interference polygon creating process comprises steps S41 to S44 in the example shown in FIG. 3.

Figure 4:
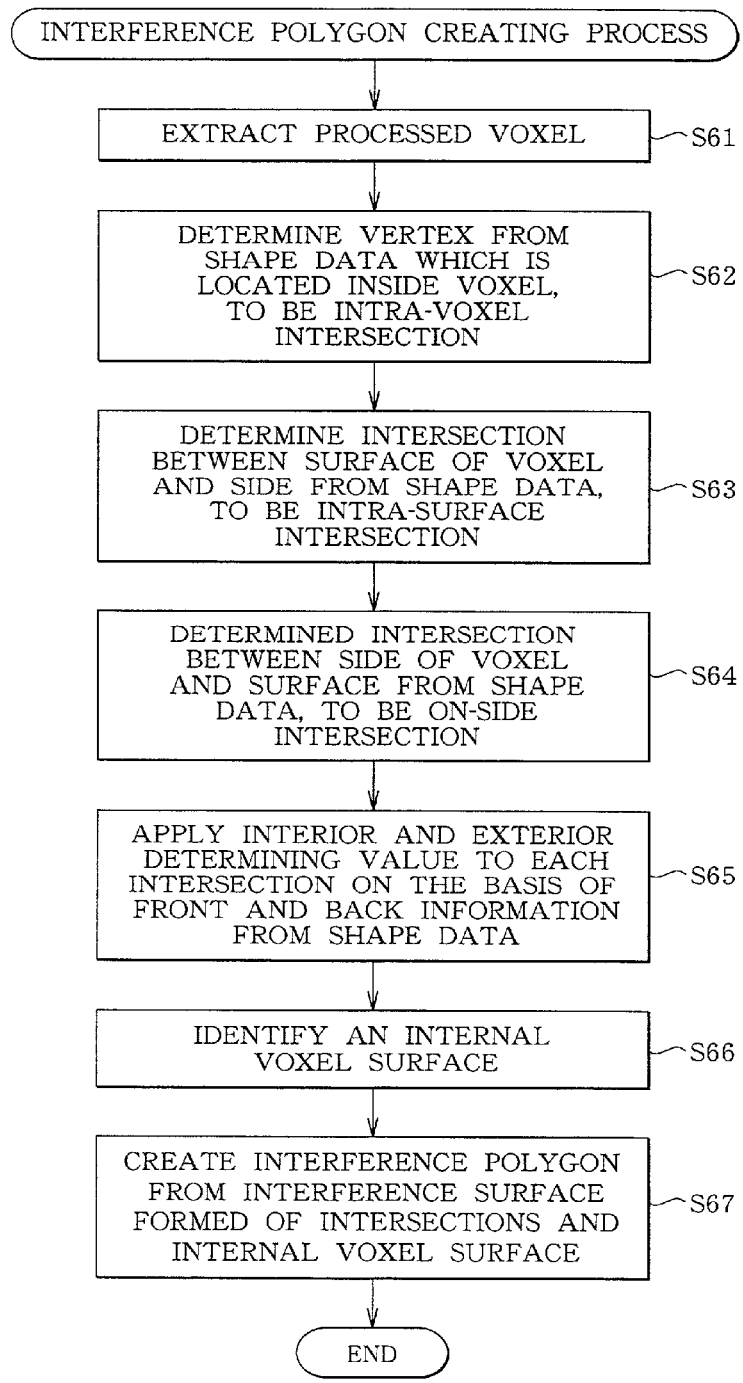
FIG. 4 is a flow chart showing, in detail, an example of a process for creating an interference polygon as shown in FIG. 3.

FIG. 4 is a flow chart showing the interference polygon creating process in detail. As shown in FIG. 4, the interference polygon creating process comprises a processed voxel extracting step (step S61) of extracting the voxel 1 interfering with the shape data 2 as the processed voxel 1, an intra-voxel intersection determining step (step S62) of determining, if any vertex from the shape data 2 is present inside the processed voxel 1, this vertex as the intra-voxel intersection 6C, an intra-surface intersection determining step (step S63) of determining, if any intersection between a surface of the processed voxel 1 and a side from the shape data 2 is present, this intersection as the intra-surface intersection 6B, and an on-side intersection determining step (step S64) of determining, if any intersection between a side of the processed voxel 1 and a surface from the shape data 2 is present, this intersection as the on-side intersection 6A.

In the example shown in FIG. 4, the interference polygon creating process further comprises an interior and exterior determining value applying step (step S65) of applying an interior and exterior determining value for interior and exterior determination to each of the intra-voxel intersection 6C, the intra-surface intersection 6B, and the on-side intersection 6A on the basis of front and back information contained in the shape data, an internal-voxel-surface identifying step (step S66, step S43 in FIG. 3) of identifying the internal voxel surfaces 3B, and an interference polygon creating step (step S67, step S44 in FIG. 3) of creating the interference polygon 3 from the internal voxel surfaces 3B and the interference surfaces 3A.

To retrieve the interference points (intersections) between the shape data and the voxel (step S41 in FIG. 3), the voxels 1 interfering with specified ones or all of the surfaces shape data 2 are retrieved. Subsequently, the interference points (intersections) 6 of the voxels 1 interfering with the shape data 2 are determined. As shown in FIG. 5, the intersections between the voxel and the shape data are of the following three types:

A surface or a side from the shape data and a side (including vertexes) of the voxel interfere with each other (on-side intersection 6A).

A side from the shape data and a surface of the voxel interfere with each other (intra-surface intersection 6B).

A vertex from the shape data and the interior of the voxel interfere with each other (intra-voxel intersection 6C). The intra-voxel intersection 6C is a vertex from the shape data which is present inside the voxel 1. Additionally, the on-side intersection 6A, the intra-surface intersection 6B, and the intra-voxel intersection 6C are collectively referred to as the intersections 6A, 6B, and 6C.

Figures 6A, 6B:
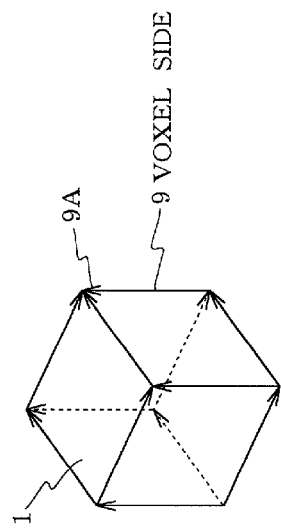
FIG. 6(A) is a view showing an example of a direction of a side of a voxel.
FIG. 6(B) is a view showing an interior and exterior determining value, which is determined by the relationship between the front and back of the shape data and the voxel side.
Figure 7A:
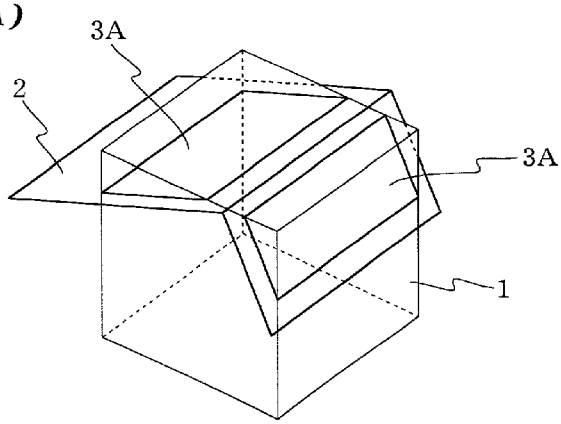
FIG. 7(A) is a view showing an example of the interference between the shape data and the voxel.
Figure 7B:
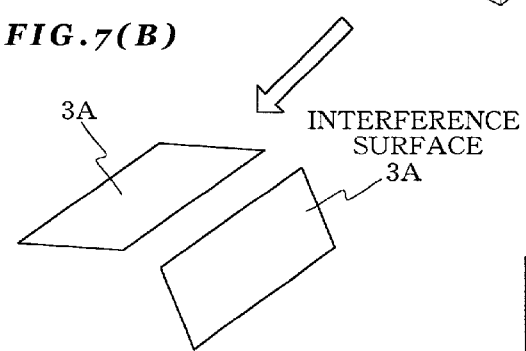
FIG. 7(B) is a view showing examples of interference surfaces composed of the external shape of the portion of the shape data which is present inside the voxel.
Figure 7C:
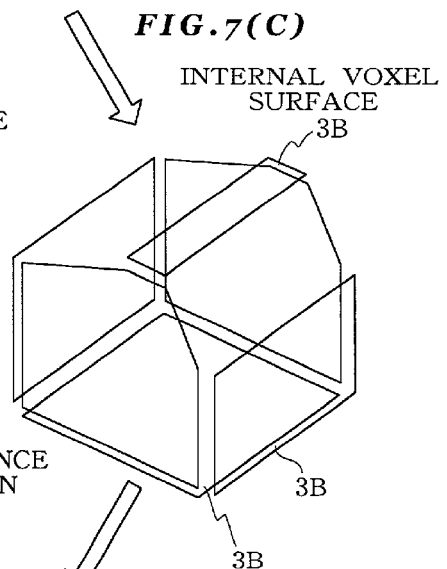
FIG. 7(C) is a view showing examples of internal voxel surfaces of the voxel which constitute inner areas from the shape data.
Figure 7D:
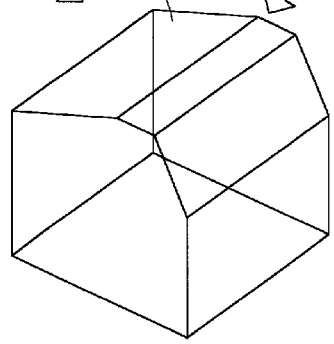
FIG. 7(D) is a view showing an example of an interference polygon composed of interference surfaces and internal voxel surfaces.

At step 65 in FIG. 4, as shown in FIG. 6(A), the direction 9A of a side 9 of the voxel has already been specified using a predetermined method, and the relationship between the direction 9A of the side 9, on which the on-side intersection 6A is present, and the interior and exterior (front and back) of the shape data 2 is examined and saved as interior and exterior determining values for the intersections 6A, 6B, and 6C. As shown in FIG. 6(B), the interior and exterior determining value is determined as described below and has one of the three types of values.

With reference to the intersection, if the positive direction of the side is outward and the negative direction thereof is inward, then the interior and exterior determining value is "+".

With reference to the intersection, if the positive direction of the side is inward and the negative direction thereof is outward, then the interior and exterior determining value is "−".

If both directions of the side are on a boundary from the shape data, then the interior and exterior determining value is "boundary".

At step S41 in FIG. 3, the processed voxel 1 interfering with the shape data 2 such as an STL surface is extracted, and the on-side intersection 6A, intra-surface intersection 6B, and intra-voxel intersection 6C of the processed voxel are retrieved. Then, the interior and exterior determining value is added to each of the intersections 6A, 6B, and 6C to determine which part of the voxel 1 corresponds to the interior of the shape data 2.

To create the interference surfaces 3A from the intersections (step S42 in FIG. 3), (1) for each of the processed voxels interfering with the shape data 2, the intersections defined at step S41 are sequentially joined together to create surfaces of a polygon in such a way as to represent the shape of the part of the shape data 2 inside the voxel. The surfaces constituting this polygon are each referred to as the "interference surface 3A". Subsequently, (2) each interference surface 3A is focused on, and if the adjacent interference surfaces (those sharing a side) are located in the same plane, they are combined into a single interference surface. Additionally, when analysis software is used for the analysis, the analysis accuracy may decrease in the presence of fine or distorted elements; thus, to avoid this, the interference surface 3A constituting the extracted element and the plane on which the interference surface 3A sits may be combined into the single interference surface 3A if the angle between the interference surface 3A and this plane. A threshold for this angle is determined by means of a user input or system set value. The "distorted shape" refers to a surface having an excessively large aspect ratio or an element having an excessively large or small height with respect to the area of the surface (this also applies to the following description).

To create the internal voxel surfaces 3B (step S43 in FIG. 3), each of the processed voxels is subjected to the following process: If any surface of the processed voxel 1 contains a side of an interference surface crossing the surface of the processed voxel 1, the target surface is divided into a plurality of areas by means of this side. In this case, the surface of the processed voxel is divided into a plurality of areas by means of the side of the interference surface. Whether each of the areas is inside or outside the shape data is determined on the basis of the interior and exterior determining values for the intersections 6A, 6B, and 6C. An area determined to be inside the shape data is defined as the internal voxel surface 3B.

The voxel surfaces of the processed voxel or the surfaces each constituting part of the corresponding voxel surface, other than the internal voxel surfaces 3B, are entirely inside or outside the shape data. Thus, whether the target voxel surface is inside or outside the shape data 2 is determined on the basis of the interior and exterior determining values for the intersections 6A, 6B, and 6C. If the voxel surface is determined to be inside the shape data, it is defined as the internal voxel surface. An attempt is made to retrieve a set of adjacent internal voxel surfaces which are present in the same plane, and if any such a set is present, then these surfaces are combined into one internal voxel surface.

As described above, the internal voxel surfaces are those of the voxel surfaces which constitute an area present inside the shape data. The internal voxel surfaces do not constitute boundary surfaces (surfaces from the shape data) between the shape data and an external space but a surface located inward of the boundary. The internal voxel surfaces 3B each correspond to part or all of a voxel surface of the processed voxel 1. The vertexes of the internal voxel surfaces 3B are also called "internal voxel vertexes".

To create the interference polygon 3 from the interference surfaces 3A and the internal voxel surfaces 3B (step S44), the interference surfaces 3A and the internal voxel surfaces 3B are combined together to form a polygon as the interference polygon 3. If a plurality of interference polygons are formed within one voxel, these polygons are each called an "interference polygon".

FIG. 7 is an explanatory representation showing an example of an interference polygon. FIG. 7(A) is a view showing an example of the interference between shape data and a voxel. FIG. 7(B) is a view showing an example of interference surfaces composed of that part of the external shape of the shape data which is present inside the voxel. FIG. 7(C) is a view showing an example of internal voxel surfaces which are voxel surfaces and which constitute an inner area of the shape data. FIG. 7(D) is a view showing an example of an interference polygon composed of the interference surfaces and the internal voxel surfaces. When the interference surfaces 3A shown in FIG. 7(B) and the internal voxel surfaces 3B shown in FIG. 7(C) are synthesized together, the interference polygon shown in FIG. 7(D) is created.

Figure 8A:
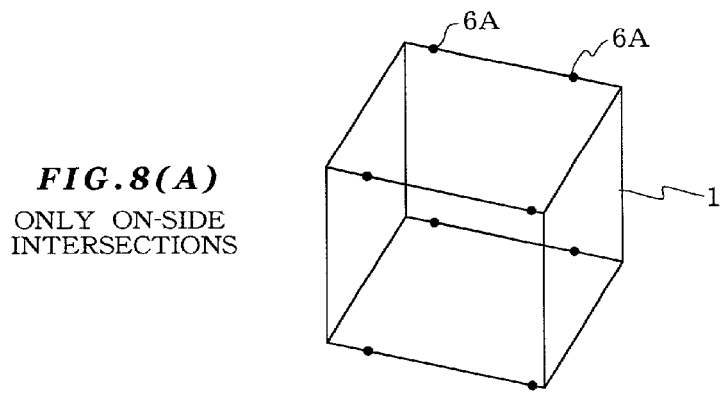
FIG. 8(A) is a view showing that the polygon is composed only of on-side intersections.
Figure 8B:
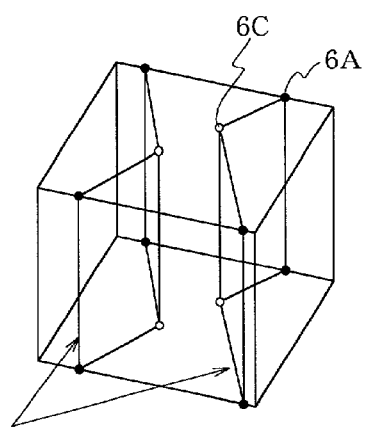
FIG. 8(B) is a view showing that the polygon includes intra-surface intersections.
Figure 8C:
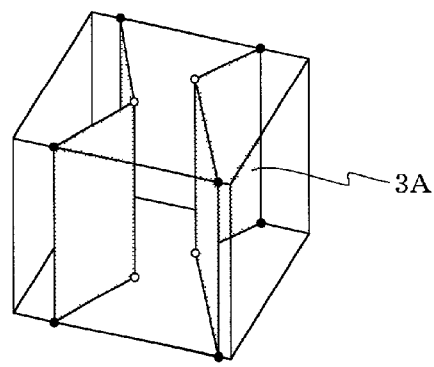
FIG. 8(C) is a view showing an example of determination of the front and back of an interference surface using intra-surface intersections.

FIG. 8 is an explanatory representation showing an example of the determination of the front and back of the interference surfaces 3A in the case where the polygon contains the intra-surface intersections 6B (and the intra-voxel intersections 6C). FIG. 8(A) is a view showing that the polygon is composed only of the on-side intersections 6A. FIG. 8(B) is a view showing that the polygon contains the intra-surface intersections 6B. FIG. 8(C) is a view showing an example of the determination of the front and back of interference surfaces using the intra-surface intersections 6B. As shown in FIGS. 3 to 7, in this embodiment, the intra-voxel intersections 6C and the intra-surface intersections 6B are created. At step S45, the intra-voxel intersections 6C and the intra-surface intersections 6B are contracted (moved) to the on-side intersections 6A. Thus, of the intersections (vertexes of the interference polygon), only the on-side intersections 6A remain as the vertexes of the divided polygon. Accordingly, the process is possible even without creating any intra-voxel intersection 6C or intra-surface intersection 6B. However, defining the intra-voxel intersections 6C and the intra-surface intersections 6B facilitates the definition of the interference surfaces 3A and the determination of the interior and exterior of the surfaces of the divided polygon 4.

If only the on-side intersections 6A are created and when the interference surface 3B is created, the shape of the interference surface 3A may differ from the shape data 2, thus requiring the intersections to be sequentially joined together to form an interference surface. However, it is difficult to determine the order in which the intersections are joined together. That is, when only the on-side intersections 6A are created and if two or more cutting planes are present, it is difficult to determine which combination of the on-side intersections approximates the interference surface 3A, and the determination of the front and back (interior and exterior) of the interference surface 3A becomes cumbersome.

On the other hand, when the intra-surface intersections 6B and the intra-voxel intersections 6C are created, the shape of the interference surface 3A becomes identical to that of the part of the shape data inside the voxel 1. Then, the process of creating the interference surfaces 3A with reference to the shape data 2 is facilitated. The interference surface 3A is thus created in accordance with the shape data 2, so that the front and back of the interference surface 3A can be determined depending on the front and back of the shape data 2.

The on-side intersections 6A each have the interior and exterior determining value. This makes it possible to determine the front and back of the internal voxel surface 3B. Since the interference surface 3A is generated on the same plane as that containing the interfering surface from the shape data 2, the front and back of the interference surface 3A can be determined with reference to the front and back of the corresponding surface from the shape data 2. On the other hand, the internal voxel surface 3B is generated on a plane different from that containing the interfering surface from the shape data 2, the information on the front and back of the shape data 2 cannot be directly used. Thus, in this embodiment, the on-side vertexes 6A have the interior and exterior determining value at step S41. This makes it possible to determine whether a side of the internal voxel surface 3B having the intersections is inside or outside the shape data 2. Then, whether the internal voxel surface 3B is inside or outside the shape data can be determined. Further, if the vertexes of the divided polygon 4 are allowed to take over these interior and exterior determining values, whether or not any point is inside the divided polygon can be determined for processes such as paring for the divided polygon 4.

<Divided Polygon Creating Process>

The divided polygon creating process comprises executing a contraction process on the interference polygon 3 to simplify the shape. That is, the interference polygon 3 is changed to the divided polygon 4, having a smaller number of vertexes. During the contraction process, first, the intra-surface vertexes 6B and the intra-voxel vertexes 6C are moved to the on-side vertexes 6A, second, the on-side vertexes 6A are moved to the internal voxel vertexes if the contraction distance is short, and third, the on-side vertexes 6A on a side having the internal voxel vertexes as both end points are moved to one of the internal voxel vertexes.

In the divided polygon creating process (step S45) shown in FIG. 3, each interference polygon 3 undergoes the following process: First, the intersections 6A, 6B, and 6C are named vertexes. The vertexes have the same reference numerals as the intersections. For example, a point which is both a vertex of the interference polygon 3 and the intra-voxel intersection 6C is defined as the intra-voxel vertex 6C. This intra-voxel vertex 6C is a vertex from the shape data which is present inside the processed voxel. Subsequently, a point which is both a vertex of the interference polygon and the intra-surface intersection 6B is defined as the intra-surface vertex 6B. The intra-surface vertex 6B is the intersection 6B between a side from the shape data 2 and a voxel surface. Then, a point which is both a vertex of the interference polygon 3 and the intra-surface intersection 6A is defined as the on-side vertex 6A.

The interference polygon 3 has a shape formed of those of its voxels which are contained inside the shape data 2.

The intra-voxel vertex 6C is both a vertex of the interference polygon 3 and the intra-voxel vertex 6C. It is thus a vertex from the shape data 2 which is present inside the processed voxel 1.

The intra-surface vertex 6B is both a vertex of the interference polygon 3 and the intra-surface vertex 6B. It is thus the intersection between a voxel surface of the processed voxel 1 and a side from the shape data 2.

The on-side vertex 6A is both a vertex of the interference polygon 3 and the on-side vertex 6A. It is thus the intersection between a voxel side of the processed voxel 1 and a surface from the shape data 2.

The internal voxel vertex 11A is one of the vertexes of the processed voxel 1 which corresponds to a vertex of the interference polygon 3. It is thus one of the voxel vertexes of the processed voxel 1 which is contained inside the shape data 2. A voxel side having the internal voxel vertexes 11A as both end points is called an "internal voxel side".

The presence of the intra-voxel vertex 6C or the intra-surface vertex 6B complicates the shape of the interference polygon 3, thus making it difficult to divide the polygon into elements of an analysis model. To prevent this, in this example, the intra-voxel vertexes 6C and the intra-surface vertexes 6B are moved to the on-side vertexes 6C.

Figure 9:
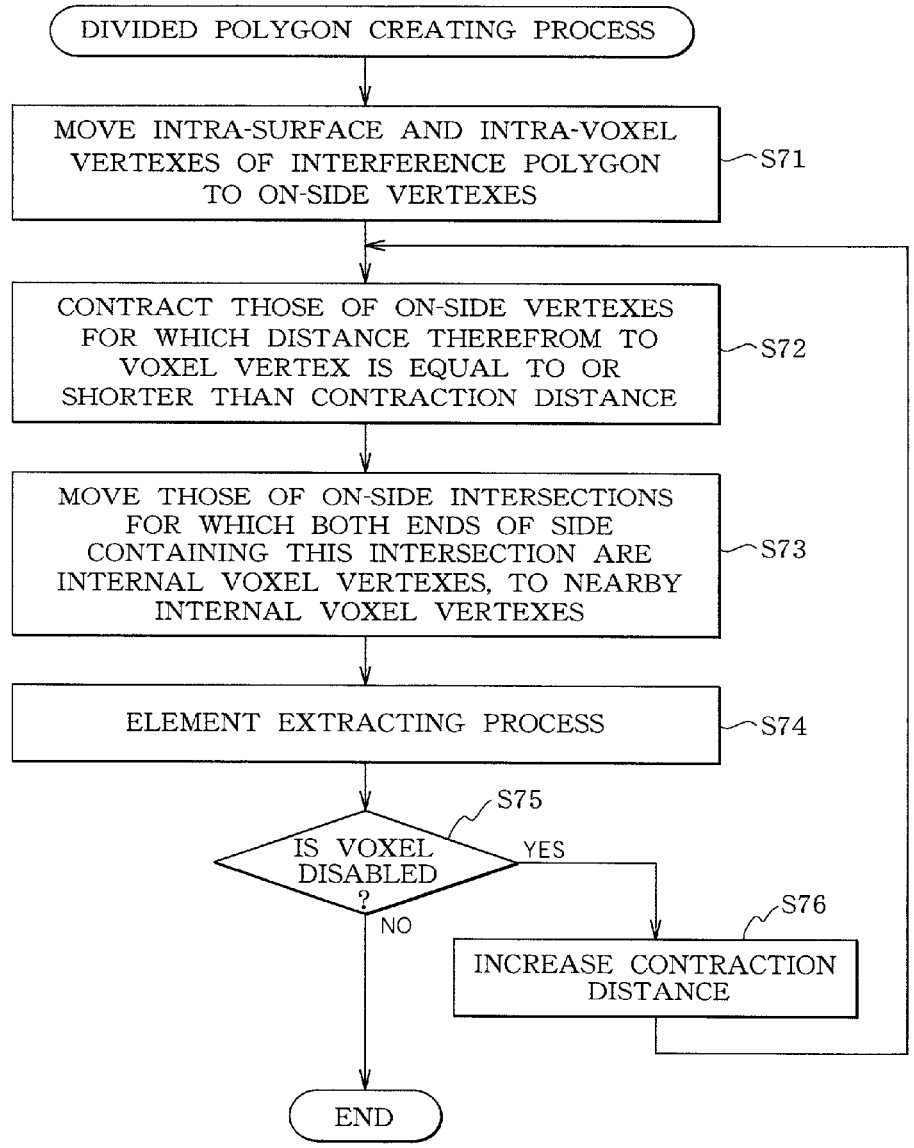
FIG. 9 is a flow chart showing an example of a divided polygon creating process shown in FIG. 3.

FIG. 9 is a flow chart showing a configuration of the divided polygon creating process in detail. As shown in this figure, the divided polygon creating process includes a vertex contracting step (step S71) of moving a vertex of the interference polygon 3 which is not located on any side of the voxel 1, to the on-side intersection 6A that is an intersection of this side of the voxel. At this vertex contracting step S71, one of the sides of the interference polygon 3 which has the on-side vertex 6A as one end point and a point that is not the on-side vertex 6A, as the other end point is retrieved, and the vertex of the retrieved side which is not the on-side vertex 6A is moved to the on-side vertex 6A. This operation is repeated to move all the intra-voxel vertexes 6C and intra-surface vertexes 6B to the on-side vertexes 6A. For example, the intra-surface vertex 6B is moved to one of the on-side vertexes 6A, and during the subsequent process, the intra-voxel vertex 6C connected to the source intra-surface vertex 6B is moved to the on-side vertex 6A to which the intra-surface vertex 6B has been moved. Once the intra-voxel vertex 6C and the intra-surface vertex 6B have been completely moved to the on-side vertex 6A, the interference polygon 3 has such a shape as having as vertexes the on-side vertex 6A and the internal voxel vertex.

Figure 10A:
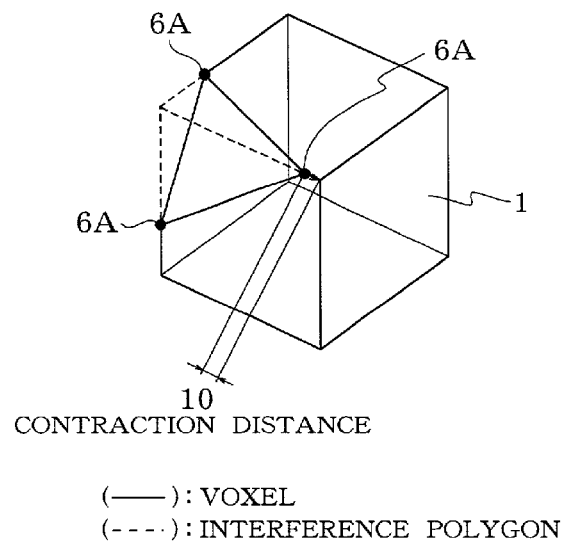
FIG. 10(A) is a view showing an example of a contraction process.
Figure 10B:
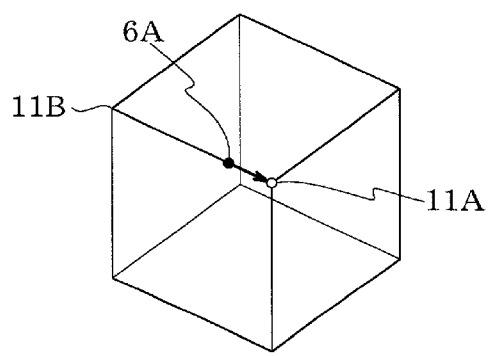
FIG. 10(B) is a view showing an example in which an on-side vertex sandwiched by internal voxel vertexes is moved to one of the internal voxel vertexes.

In the example shown in FIG. 9, the divided polygon creating process includes a contraction process step (step S72) of contracting, if the distance from the on-side intersection 6A to the voxel 1 is shorter than the predetermined contraction distance 10, the on-side intersection (contracted intersection) to the voxel vertex. At the contraction process step S72, as shown in FIG. 10(A), if the distance from the internal voxel vertex is shorter than the contraction distance 10, the on-side vertex 6A is moved to the internal voxel vertex 11A for integration.

In this contraction process, to avoid generating fine or distorted elements, for those vertexes of the interference polygon 3 which are not the internal voxel vertex 11A, the distance from each of these vertexes to the internal voxel vertex 11A is determined. If the distance (contraction distance) is short, this vertex is moved to the internal voxel vertex. The contraction distance 10 acts as a threshold for determining whether or not the contraction is required for the distance from the internal voxel vertex 11A to the on-side vertex 6A. First, the internal voxel vertex 11A is focused on, and a side of the interference polygon 3 which has this vertex as one end point is identified. Then, if the distance from the on-side vertex 6A on the identified side to the internal voxel vertex 11A is shorter than the contraction distance, the on-side vertex 6A is moved to the internal voxel vertex 11A for integration. Thus, the distorted elements are cut off and the shape of the interference polygon 3 is simplified. The threshold for the contraction distance 10 for determining whether or not to move to the internal voxel vertex 11A is input by the user or automatically set beforehand.

The divided polygon creating process further includes an internal-on-side-intersection moving step (step S73) of moving, if a side having the internal voxel vertexes 11A as both end points has the on-side intersection 6A thereon, this on-side intersection 6A (internal on-side intersection) to one of the internal voxel vertexes 11A which is close thereto. The internal on-side intersection occurs when a certain vertex of a distorted element is contracted to the internal voxel vertex 11A, with the result that another vertex of this element sits on a side having the internal voxel vertexes 11A as both endpoints. Additionally, the internal on-side intersection may occur if the shape data hollows out the voxel.

In the internal-on-side-intersection moving process, if a side to which the on-side vertex 6A of the interference polygon 3 belongs has the internal voxel vertexes 11A as both ends, that is, the side to which the on-side vertex 6A belongs is an internal voxel side, the on-side vertex is contracted to one of the two internal voxel vertexes 11A which is closer to the on-side vertex.

Specifically, first, vertexes (on-side vertexes) of the interference polygon 3 which are not voxel vertexes are retrieved. Then, those of the sides of the interference polygon 3 having the retrieved on-side vertex 6A which have the voxel vertex 11A as the end point opposite to the retrieved vertex 6A are retrieved. Furthermore, those of the retrieves sides which have two or more internal voxel vertexes 11A on the same voxel side are retrieved. If any such a side is present, the vertex of the interference polygon 3 is moved to one of the voxel vertexes 11A belonging to the retrieved side which is closer to the vertex of the interference polygon 3.

The on-side vertex 6A is present on the internal voxel side if any vertex of the interference surface is contracted to the internal voxel vertex 11A, with the other vertexes that have not been contracted constituting internal on-side intersections, if any vertex from the shape data 2 is inside the internal voxel side, if the inside of the internal voxel side is hollowed out by the shape data 2 to generate two voxel sides on the internal voxel side, etc. The two on-side vertexes 6A present on the internal voxel side are moved to the internal voxel vertex 11A together with the intra-surface vertexes 6B or intra-voxel vertexes 6C connected to these on-side vertexes 6A.

If the movement of the vertexes (intersections 6A, 6B, and 6C) of the interference polygon 3 causes a plurality of vertexes to be placed at the same location, then these vertexes are combined into one vertex of the divided polygon 4. If any vertexes of the interference polygon 3 are moved or replaced with one vertex, the internal voxel surface 11A and interference surface 3A having these vertexes are changed in shape depending on the new vertex. Further, if any point is moved to a plane with a surface that does not have its shape modified, this surface maybe divided. This surface division is carried so that the interference surface 3A that has become three-dimensional due to the movement of the intra-voxel intersections is made planar.

After the intra-surface intersections, intra-voxel intersections, contracted intersections, and internal on-side intersections have been moved to other on-side intersections, the remaining on-side intersections are connected together to create a divided polygon.

Thus, in this embodiment, predetermined on-side vertexes of the interference polygon are moved to internal voxel vertexes or are combined together to simplify the shape of the interference polygon, thereby obtaining a divided polygon. This contraction process avoids generating fine or distorted elements and contributes to generating elements of shapes that can be handled by the analysis system.

Further, in the example shown in FIG. 9, if the divided polygon 4 thus created fails to allow elements to be properly extracted (step S74, corresponding to step S49 shown in FIG. 3), that is, any voxel cannot be processed (step S75, corresponding to step S52 shown in FIG. 3), then the contraction distance 10 is increased at step S72 (contraction distance changing step) to create the divided polygon 4 again. Thus, the level of simplification of the interference polygon 3 is sequentially increased until the element 5 can be extracted, thus achieving such simplification that has few elements that can be normally processed. This serves to maintain the balance between the automation of element extraction and the improvement of the accuracy.

<Element Extracting Process>

Figure 11:
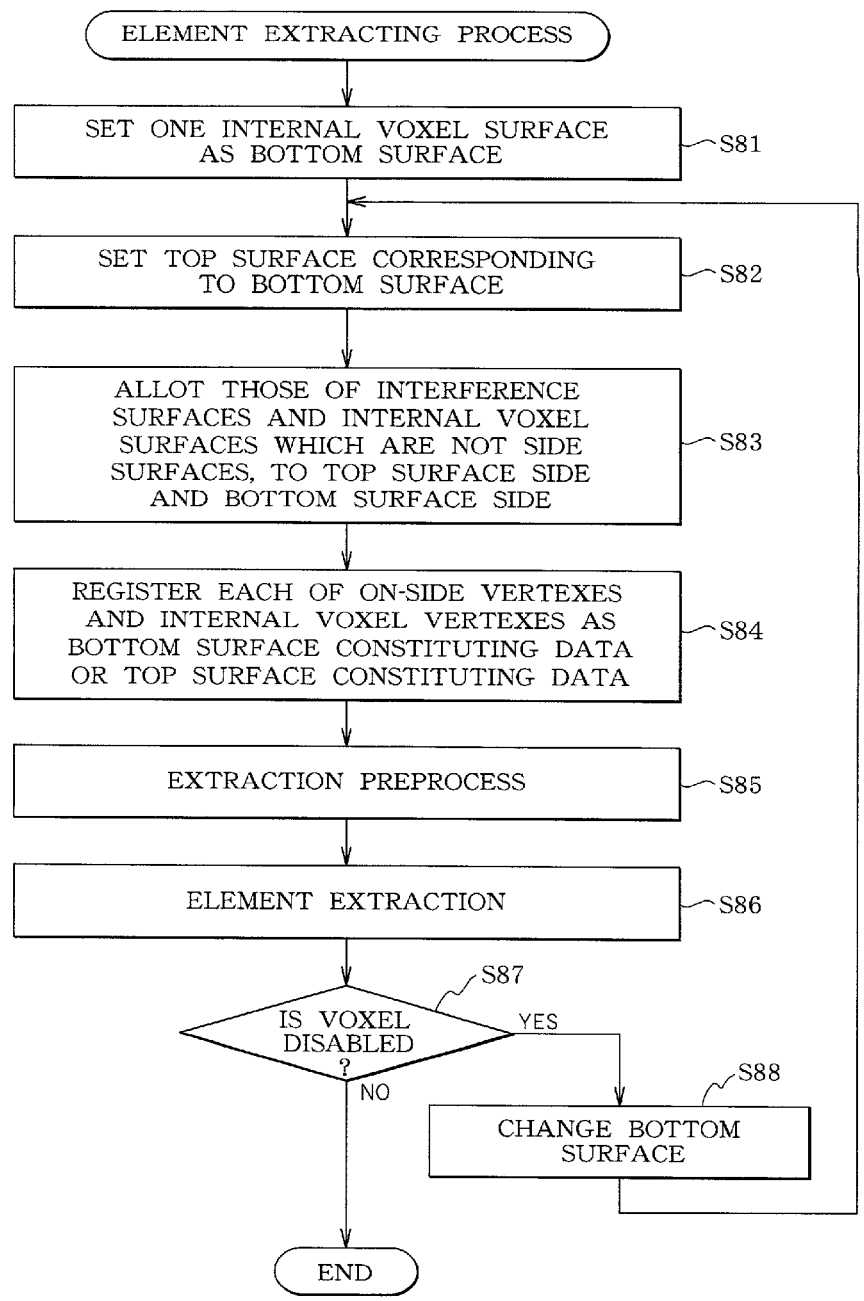
FIG. 11 is a flow chart showing an example of an element extracting process shown in FIG. 3.

FIG. 11 is a flow chart showing an example of the element extracting process shown in FIG. 3. In this example, the element extracting process comprises a bottom surface setting step (step S81) of identifying one internal voxel surface of the divided polygon 4 which has a predetermined property and setting the identified internal voxel surface as the bottom surface 12, a top surface setting step of identifying the top surface 13 corresponding to the bottom surface 12 set at the bottom surface setting step S81, a vertex allotting step (step S83) of allotting all the vertexes 6A and 11A of the divided polygon 4 to the top surface side and the bottom surface side, and an extraction preprocess step S85 of defining a plane 7A perpendicular to the internal voxel surface on the basis of the relationship between the vertexes allotted to the bottom and top surfaces at the top and bottom surface allotting step S83.

The extraction preprocess step comprises stabilizing the extraction of the element 5 utilizing the correspondences between the vertexes on the top and bottom surface sides. The relationship between the top and bottom surface side vertexes which is identified at the extraction preprocess step is called "pairs". To extract pairs, in the example in FIG. 11, the vertexes and sides of the divided polygon 4 are allotted to the top and bottom surface sides. The same vertex or side may be included in both the top and bottom surface sides.

In this case, the group of vertexes belonging to the bottom surface side and the sides and diagonals associated with these vertexes are collectively called "bottom surface constituting data 14". Also, the group of vertexes belonging to the top surface side is called "top surface constituting data 15". At step S46 shown in FIG. 3, the process at steps S81 to S84 shown in FIG. 11 is executed.

FIG. 12 shows an example of the top surface 13 and bottom surface 12 of the divided polygon 4. At step S46 and subsequent steps in FIG. 3, the divided polygon 5 is divided so as to change the complicated shape of the interference polygon 4 to one that can be handled by the analysis system. At step S46, pair data are created to determine divided surfaces for use in dividing the divided polygon 4 into the element 5 and the remaining part. The pair data indicate the correspondence between the on-side vertex 6A and a corresponding predetermined point. That is, the pair data indicate the correspondences between the vertexes of the divided polygon 4. These pair data are used to divide the complicated divided polygon.

To create the pair data, the vertexes or the like of the divided polygon are divided into the bottom surface constituting data 14 and the top surface constituting data 15. The process of dividing the elements of the divided polygon into the bottom and top surface constituting data 14 and 15 is such that when a certain surface of the divided polygon is assumed to be the bottom surface, the polygon is wrapped in a virtual soft cloth from above and below, that is, in a direction perpendicular to the bottom surface, so that the surfaces and sides coming into contact with the top surface side of the cloth are registered as the top surface constituting data 15, while the surfaces and sides coming into contact with the bottom surface side of the virtual cloth are registered as the bottom surface constituting data 14. If the vertexes or the like are allotted to the top and bottom surface sides and then the divided polygon 4 is divided using the plane 7A perpendicular to the bottom surface, as described above, then elements can be stably extracted even from a polygon of a complicated shape such as one having two or more cutting surfaces.

To allot the vertexes to the top and bottom surface sides, first, one of the internal voxel surfaces of the divided polygon 4 is selected, and a voxel surface to be used as a reference for element cutting-off (this surface is hereafter referred to as a "voxel bottom surface") is identified. With a plurality of internal voxel surfaces, for example, the internal voxel surface of the largest area is defined as the initial bottom surface 12, which is registered as the bottom surface constituting data 14. A voxel surface containing the bottom surface is called a "voxel bottom surface". A voxel surface opposite to and parallel with the voxel bottom surface is called a "voxel top surface". Whether or not the voxel top surface contains any surface of the divided polygon 4 depends on the manner of the interference between the shape data and the voxel data. Voxel surfaces that are not the voxel top surface or the voxel bottom surface are called "voxel sides" herein.

Figure 12A:
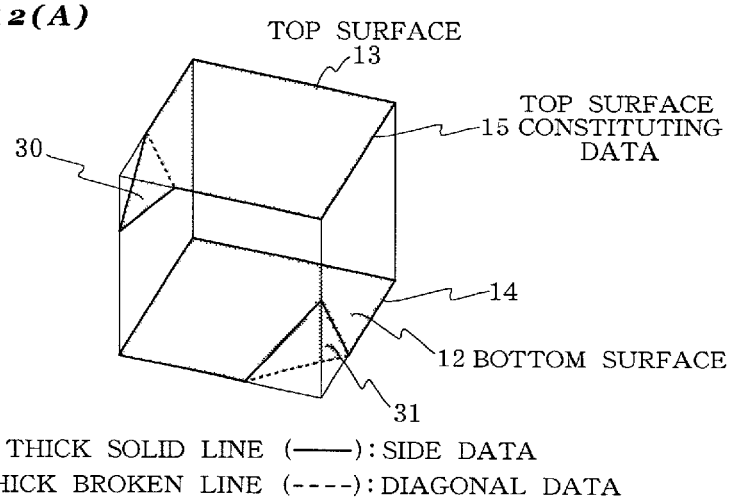
FIG. 12(A) is a view showing an example in which a top surface is contained in a voxel top surface.

Once the vertexes or the like of the bottom surface 12 are registered as the bottom surface constituting data 14, the top surface constituting data 15 are created. For this purpose, the interference surface 3A or internal voxel surface 3B opposite to the bottom surface 12 is identified as the top surface 13. To identify the top surface 13, it is checked whether or not any internal voxel surface 3B is present on the voxel top surface. As shown in FIG. 12(A), if any internal voxel surface 3B is present on the voxel top surface, it is called the "top surface 13", which is registered as the top surface constituting data 15. At this time, all the interference surfaces 3A and internal voxel surfaces 3B that share a side with the top surface 13 but not any intersection with the bottom surface 12 are registered as the top surface constituting data 15. In the example shown in FIG. 12, the interference surface 3A of a triangle 30 sharing a side with the top surface and extending leftward and downward from the top surface as shown in the figure is registered as the top surface constituting data 15. Further, all the interference surfaces 3A and internal voxel surfaces 3B that share a side with the bottom surface 12 but not any intersection with the top surface 13 are registered as the bottom surface constituting data 14. In the example shown in FIG. 12(A), the interference surface 3A of a triangle 31 sharing a side with the bottom surface 12 and extending frontward and upward from the bottom surface as shown in the figure is registered as the bottom surface constituting data 14.

Figure 12B:
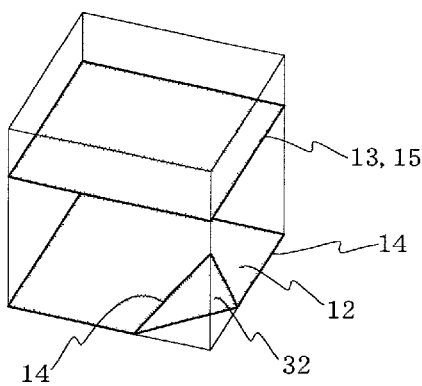
FIG. 12(B) is a view showing an example in which the top surface is not contained in the voxel top surface and shares no side with a bottom surface.

As shown in FIG. 12(B), if no internal voxel surface is present on the voxel top surface, first, one of the interference surfaces 3A sharing no side with the bottom surface 12 is retrieved. If such an interference surface 3A is present, it is called the "top surface 13", which is registered as the top surface constituting data 15. Furthermore, all the interference surfaces 3A and internal voxel surfaces 3B that share a side with the top surface 13 but not any intersection with the bottom surface 12 are registered as the top surface constituting data 15, whereas all the interference surfaces 3A and internal voxel surfaces 3B that share a side with the bottom surface 12 but not any intersection with the top surface 13 are registered as the bottom surface constituting data 14. In the example shown in FIG. 12(B), the interference surface 3A of a triangle 32 extending upward is added to the bottom surface constituting data 14, as in FIG. 12(A).

Figure 12C:
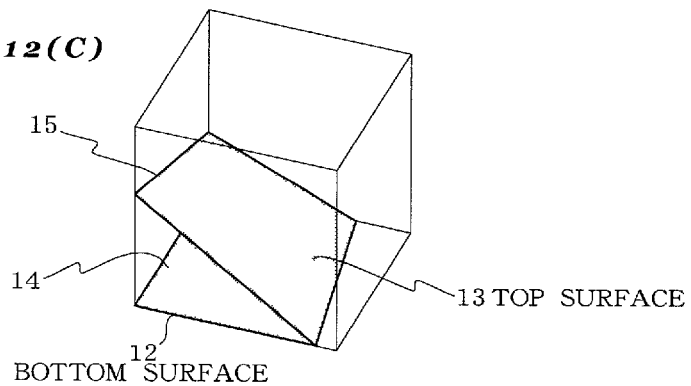
FIG. 12(C) is a view showing an example in which the top surface and the bottom surface share a side.

As shown in FIG. 12(C), if no interference surface 3A shares a side with the bottom surface 12, one of the interference surfaces 3A is selected and registered as the top surface constituting data 15. It is then checked whether or not all the intersections are contained in the bottom surface constituting data 14 or the top surface constituting data 15. If there are intersections that are not contained in either the bottom or top surface constituting data, the interference surfaces 3A and internal voxel surfaces 3B sharing a side with the interference surfaces 3A contained in the top surface constituting data 15 are added to the top surface constituting data 15. This operation is repeated to allow all the intersections to be contained in the bottom surface constituting data 14 or the top surface constituting data 15.

Those of the sides belonging to the bottom surface constituting data 14 which each constitute only one surface are retrieved. These sides are joined together to create one loop, which constitutes side data of the bottom surface constituting data 14. Those of the sides in the bottom surface constituting data 14 which are different from the side data constitute diagonal data. Similarly, side and diagonal data are created from the top surface constituting data 15.

<Bottom Surface Constituting Data 14 and Top Surface Constituting Data 15>

The definitions of the bottom surface constituting data 14 or the like will be explained again. All the vertexes (on-side vertexes or internal voxel vertexes) of the divided polygon 4 are contained in one or both of the bottom surface constituting data 14 and the top surface constituting data 15. The bottom surface constituting data 14 contain the internal voxel surface 3A.

In this embodiment, if any internal voxel surface 3B or interference surface 3A is opposite to the bottom surface 12, the vertical plane 7A can be used to divide the divided polygon 4 of a complicated shape. The side opposite to the bottom surface 12 constitutes the top surface constituting data 15. After the bottom surface 12 has been defined, the interference surfaces 3A and internal voxel surfaces 3B obtained when the on-side vertexes 6A were retrieved from the bottom of the voxel constitute the bottom surface constituting data 14, while the interference surfaces 3A and internal voxel surfaces 3B obtained when the on-side vertexes 6A were retrieved from the top of the voxel 1 constitute the top surface constituting data 15.

The bottom surface constituting data 14 have either or both of the internal voxel vertexes 11A and the on-side vertexes 6A, and the top surface constituting data 15 have either or both of the internal voxel vertexes 11A and the on-side vertexes 6A. The side data comprise a loop joining the ends (outer peripheries) of the shape in the top surface constituting data or the bottom surface constituting data 14. Those of the sides in the top surface constituting data 15 or the bottom surface constituting data 14 which do not belong to the side data and which are shared by two surfaces are called "diagonal data". The divided polygon 4 is composed of the sides from the side data, the diagonal data, and the sides that are not contained in either the side data or the diagonal data (side-surface side data).

Figure 13C:
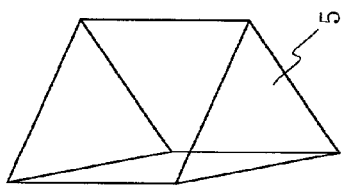
FIG. 13 is an explanatory representation useful in explaining a bottom surface changing process shown in FIG. 11.
FIG. 13(A) is a view showing an example in which the bottom surface is an internal voxel surface of the largest area.
FIG. 13(B) is a view showing an example in which the bottom surface is changed, and FIGS. 13(C) and (D) are views showing an example in which the polygon is divided on the basis of the changed bottom surface.
Figure 13D:
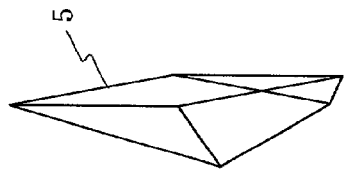
Figure 13B:
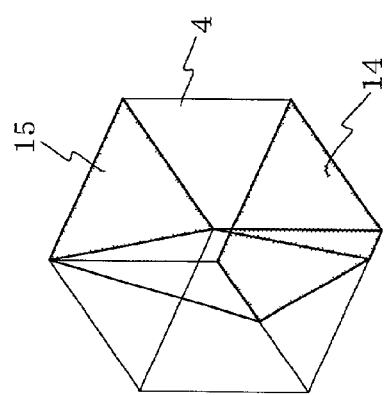
Figure 13A:
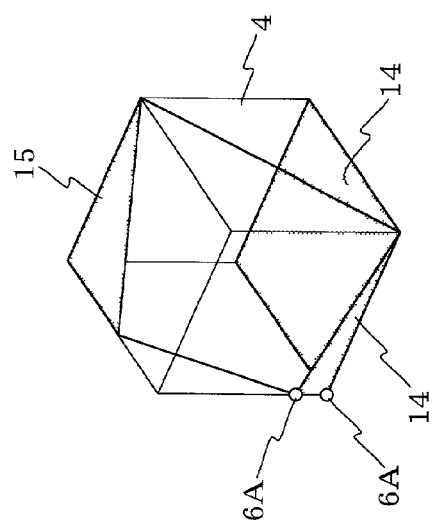

In the example shown in FIG. 11, if any divided polygon is prevented from being extracted as an element at step S86 (disabled voxel), the bottom surface 12 is changed (step S88, bottom surface changing step). For example, when the largest internal voxel 3B is defined as the bottom surface 12 as shown in FIG. 13(A), the subsequent process may be disabled. When, however, the bottom surface 12 is then changed, the shape is changed, for example, as shown in FIG. 13(B); this shape can be easily divided into the two elements 5 shown in FIGS. 13(C) and (D), using the plane 7A perpendicular to the bottom surface 12. The change of the bottom surface 12 is tried on all the six surfaces, and if the divided polygon 4 still cannot be processed, then in the example in FIG. 3, its shape is further simplified.

<Extraction Preprocess>

Figure 14:
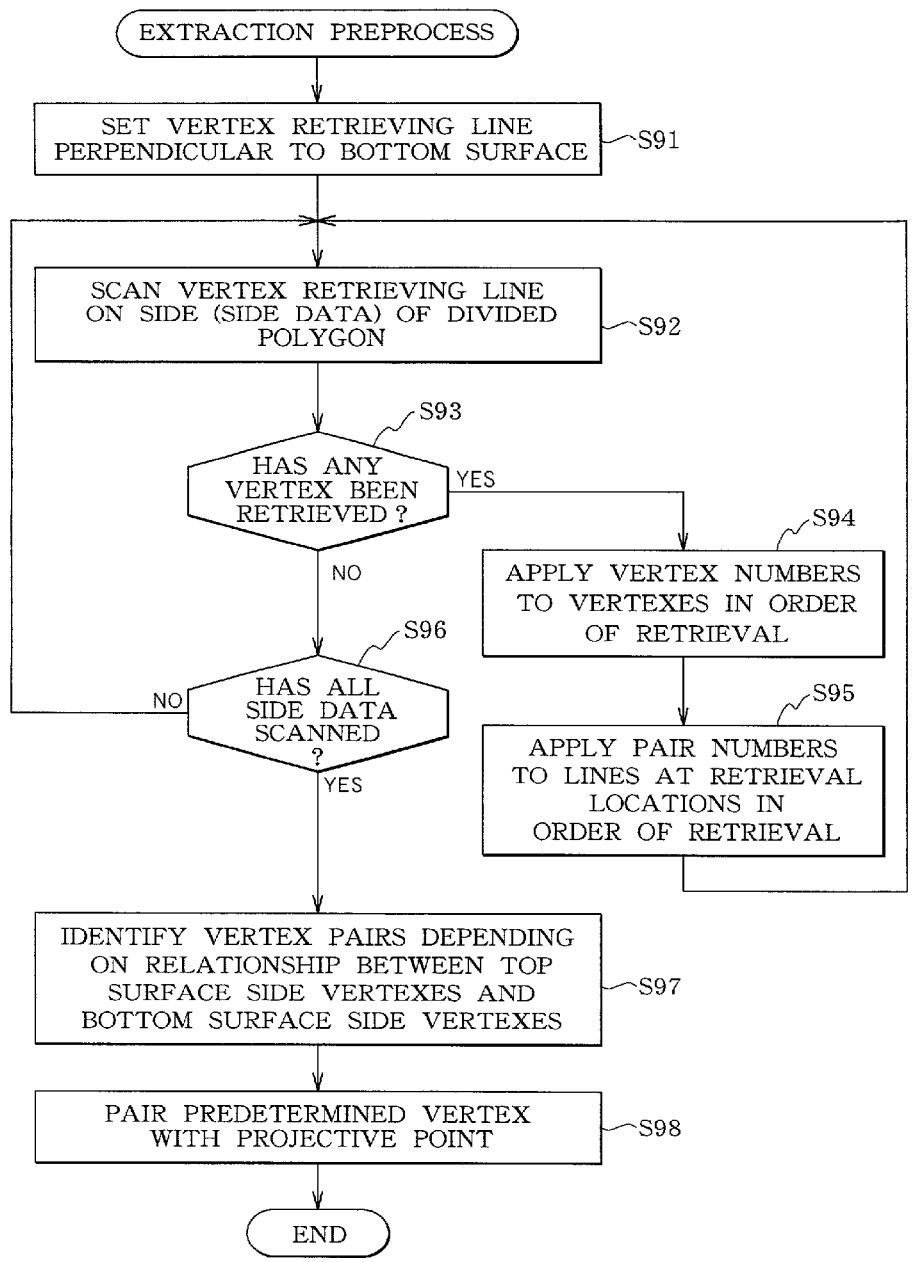
FIG. 14 is a flow chart showing an example of an extraction preprocess shown in FIG. 3.

FIG. 14 is a flow chart showing an example of the extraction preprocess shown in FIG. 3. In the extraction preprocess, first, a vertex retrieving line perpendicular to the bottom surface 12 is generated (step S91) and then scanned on the side surfaces extending from the bottom surface of the divided polygon (step S91, vertex retrieving line scanning step). If any vertex of the divided polygon 4 is discovered during the scanning of the vertex retrieving line (step S93), this vertex is numbered (step S94), and the vertex retrieving line is imparted with a pair number at the location of the discovery (step S94, pair number applying step). At this time, if vertexes are simultaneously discovered in the top-surface-side side data and the bottom-surface-side side data, then they are identified as a pair at step S97. On the other hand, if any vertex is discovered in either the top-surface-side side data or the bottom-surface-side side data, the side data in which no vertex has been discovered are provided with a spare projective point.

Once the scanning at the vertex retrieving line scanning step S93 is completed (step S96), the vertexes on the bottom surface side and the vertexes on the top surface side a repaired on the basis of a plurality of lines imparted with pair numbers at the pair number applying step and of the presence of vertexes on the bottom and top surface sides for each line (step S97, pair generating step). If the intersection between a side of the divided polygon and a pair-numbered line having a vertex not paired at the pair generating step S97 is inside the shape data, this intersection is set as the projective point, and this projective point and the corresponding vertex are added as a pair (step S98, projective-point setting step).

In this example, a plane composed of a pair containing the projective point and another pair is used as a surface for element extraction, so that an element can be extracted using a plane perpendicular to the bottom surface. In other examples, a plain defining step may be provided to define the plane for element extraction on the basis of the relationship between the pair of vertexes having the projective point. Additionally, if the element 5 extracted at the element extracting step has a distorted shape, a distorted shape excluding step may be provided to avoid extracting this distorted shape as the element.

Figure 15A:
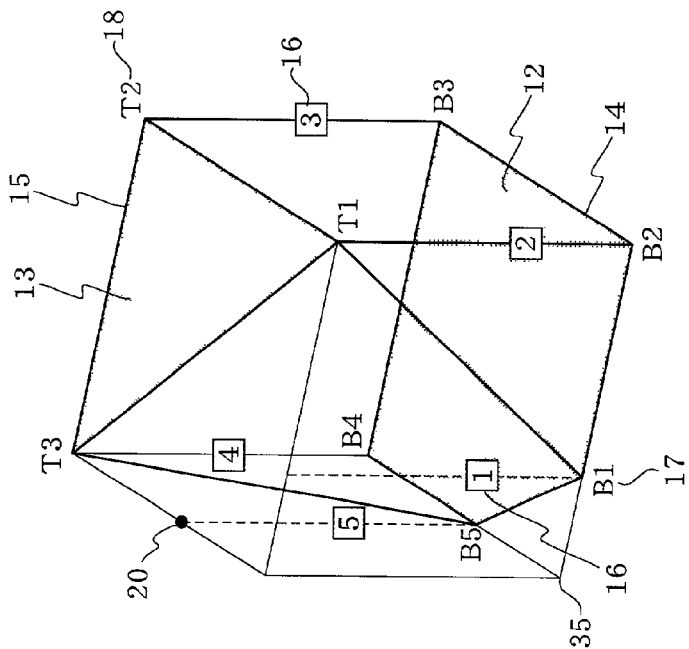
FIG. 15(A) is a chart showing an example of pair data defined for the divided polygon.

FIG. 15 is an explanatory representation showing an example of the manner of handling the pair data during the extraction preprocess shown in FIG. 14. It is assumed that a divided polygon 4 shown in FIG. 15(A) is present and a bottom surface 12 is selected. An example of processing on the divided polygon 4 will be explained in accordance with the flow chart shown in FIG. 14. First, a side of the voxel which is perpendicular to a voxel surface containing the bottom surface 12 is identified as a vertex retrieving line (step S91). This vertex retrieving line is scanned on the outer peripheries of the voxel surface containing the bottom surface 12 (step S92). Since all the vertexes of the divided polygon 4 are located on sides of the voxel 1, the vertex retrieving line meets all the vertexes of the divided polygon 4.

In the example shown in FIG. 15(A), that vertex of the voxel surface containing the bottom surface 12 which is located in the lower left of the figure is defined as an end point 35, and a line perpendicular to the bottom surface 12 is defined as the vertex retrieving line and used to carry out clockwise scanning. First, a vertex B1 is retrieved (step S93). This vertex is imparted with a number B1, indicating that it is the first (step S94). A line overlapping the vertex retrieving line at the location where the vertex B1 was retrieved is imparted with a pair number 1, indicating that this line is the first (step S95). The intersections between the line with the pair number 1 and the top-surface-side side data include no vertex, so that the vertex B1 is determined to have "no" corresponding vertex (FIG. 15(B)).

The scanning is further continued (step S92), and then a bottom-surface-side vertex B2 and a top-surface-side vertex T1 are retrieved at the location of a voxel side (step S93). These vertexes are imparted with the vertex numbers B2 and T1 (step S95), and a pair line constituting a side connecting the pair of vertexes together is imparted with a pair number 2 (step S95). Since the vertexes B2 and T1 are present on a line perpendicular to the bottom surface, they are immediately treated as a pair as shown in FIG. 15(B). The scanning and retrieval is repeated (steps S93 to S95), and when a vertex B5 is retrieved, the side data are completely scanned (step S96). Once the scanning is completed, the pair data are as shown in FIG. 15(B). At step S97, the pairing process is executed to pair the vertex B1 with the vertex T1 and vertex B5 with a vertex T3, as shown in FIG. 15(C). In the example shown in FIG. 15(A), no pair of a vertex with a projective point exists.

The determination of the pair data will be described in detail. As shown in FIG. 14, in this example, the vertex retrieval line is used to retrieve vertexes contained in the side data of the bottom surface constituting data 14 and vertexes contained in the side data of the top surface constituting data 15. A vertex retrieving line perpendicular to the bottom surface 12 is scanned on the side data, and as vertexes from the side data sit on this vertex retrieving line, the vertexes and the line are imparted with the corresponding vertex and pair numbers. Then, the retrieved vertexes are imparted with vertex numbers in the order in which they were retrieved. Accordingly, the vertex numbers indicate the order representative of a loop of the bottom surface constituting data 14 and a loop of the top surface constituting data 15. Elements can be extracted using the fact that the vertex numbers are indicative of the continuity between the vertexes. Furthermore, the vertex retrieving line is imparted with a pair number at a location where a vertex overlaps it.

The vertex retrieving line is scanned on the voxel side surfaces. If the vertex retrieving line contains any on-side vertex, it is imparted with a pair number at this location, and the retrieved vertex (on-side vertex of the divided polygon) of the top surface constituting data 15 is imparted with the corresponding vertex number. If vertexes are simultaneously retrieved from the side data of the bottom surface constituting data 14 and of the top surface constituting data 15, the retrieved vertexes are immediately defined as a pair. If, for example, a side from the side-surface side data constitutes a line perpendicular to the bottom surface (internal voxel surface) 12, when this side-surface side is retrieved by means of the vertex retrieving line, the vertexes of the side-surface side located at both ends thereof are imparted with the same vertex number.

Further, if two or more vertexes from the bottom surface constituting data 14 simultaneously overlap the vertex retrieving line or two or more vertexes from the top surface constituting data 15 simultaneously overlap the vertex retrieving line, then this voxel may be treated as disabled one for a more preferable element extracting process. That is, in this example, in the case shown in FIG. 13(A), such a voxel may be temporarily treated as disabled. When the voxel is determined to be disabled, a retry such as the change of the bottom surface is executed.

The pairs of the pair numbers provided as described above and the corresponding vertex numbers are called "pair data". The pair data define the line between the vertexes identified by the vertex numbers. Arranging the pair data in the order of the pair numbers results in a list such as the one shown in FIG. 15(B). This list is called a "pair data list". In this list, if one pair data contains vertexes from the bottom surface constituting data 14 and from the top surface constituting data 15, these vertexes are paired. The line constituting the pair is called a "pair line". The pair line is identified by the retrieving line number.

Figures 16A, 16B:
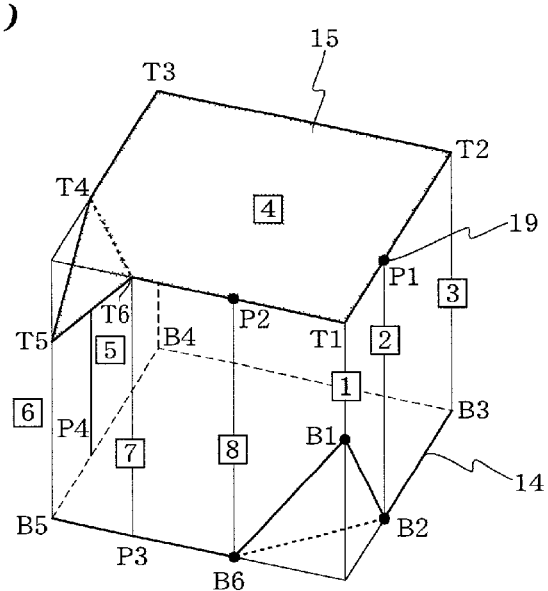
FIG. 16(A) is a chart showing an example of pair data defined for the divided polygon.
FIG. 16(B) is a chart showing an example of a pair data list in initial conditions.

FIG. 16 is an explanatory representation showing an example of the case where projective points are contained in the pair data. A pair number 2 defines a projective point P1. It is assumed that a predetermined pairing process causes the projective point P1 to be paired with the vertex B2. Likewise, projective points P2, P3, and P4 are defined. FIG. 16(B) shows a pair data list as obtained in this case. In the example shown in FIG. 16, if the projective points are assumed to be paired with the vertexes, then, an element is cut off at the plane composed of the points P1, B2, B6, and P2. Then, an element is cut off at the plane composed of the points T6, P3, P4, and T4. It can be easily determined on the basis of the relationship between the vertexes that a hexahedron is extracted by cutting the remaining shape at the plane composed of the points P1, B2, P4, and T4. When projective points are thus defined using a vertex retrieving line perpendicular to the bottom surface 12 in order to facilitate the cutting of the polygon at a plane perpendicular to the bottom surface 12, elements can be stably extracted.

The pair line is a side-surface side of the divided polygon 4 or a cutting line leading from a top- or bottom-surface-side vertex of the divided polygon 4 to a projective point obtained by projecting this vertex onto a side of the bottom or top surface of the divided polygon. If the side-surface side is perpendicular to the bottom surface, the corresponding paired line has already been defined.

Figures 17A, 17B:
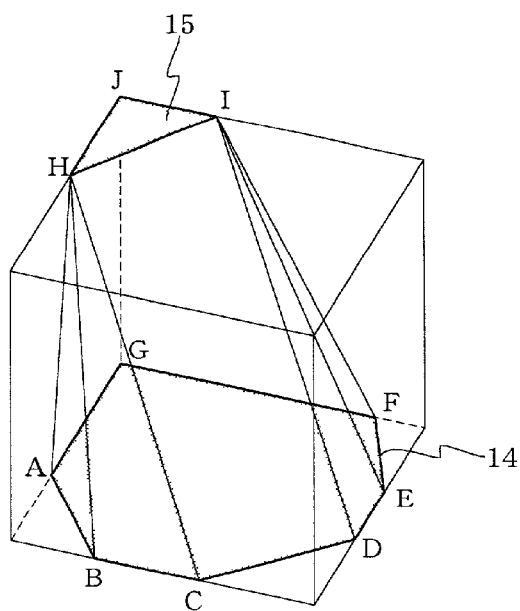
FIG. 17(A) is a view showing an example of pair data defined for the divided polygon.
FIG. 17(B) is a chart showing an example of a pair data list in initial conditions.

An attempt is made to pair vertexes that have not been paired, by executing one of the processes described below or a combination thereof. This will be described with reference to FIGS. 17 and 18. The divided polygon 4 shown in FIG. 17(A) has a shape that makes it relatively difficult to identify pairs, and only pairs G and J are identified when the scanning is completed. FIG. 17(B) shows a pair list data as obtained under these conditions.

First pairing process: If two unpaired pair data are continuously arranged, and if one of the pair data contains only vertexes from the bottom surface constituting data 14 (top surface constituting data 15), while the other contains only vertexes from the top surface constituting data 15 (bottom surface constituting data 14), then the two pair data are combined into one, which is then imparted with the smaller of the two numbers. Then, the numbers of the pair data having numbers larger than the above smaller number are each reduced by one. This makes it possible to identify, as a pair, such a side-surface side as inclined within a voxel side surface constituting a scanning surface for the vertex retrieving line. For example, the points A and H shown in FIG. 17(A) can be paired and the points I and F shown in the same figure can be paired. FIG. 18(A) shows a pair data list as obtained by executing the first pairing process.

Second pairing process: If any pair data are unpaired and the corresponding vertex (a vertex from the top surface constituting data 15 if the pair data contain only vertexes from the bottom surface constituting data 14 or a vertex from the bottom surface constituting data 14 if the pair data contain only vertexes from the top surface constituting data 15) is contained in the adjacent pair data, this corresponding vertex is registered as the pair data and is paired. This makes it possible to identify such a pair as having two side-surface sides leading from one vertex from the bottom surface constituting data 14 (top surface constituting data 15) to two vertexes the top surface constituting data 15 (bottom surface constituting data 14). The second pairing process preferably follows the first pairing process. In the example shown in FIG. 18(B), the relationship shown by reference numeral 21 corresponds to the second pairing process.

Third pairing process: If any pair data are unpaired and contains any portion of the bottom surface constituting data 14 (top surface constituting data 15), the corresponding vertex is projected onto side data of the top surface constituting data 15 (bottom surface constituting data 14). For example, an on-side vertex from the bottom surface constituting data 14 is projected in the same direction as that of the vertex retrieving line. If the vertex is projected on a side of the upper surface constituting data 15, this is treated as a projective point and paired with the on-side vertex. If this projective point can be defined, it is registered as the pair data and is paired. On the other hand, if the projective point is outside the divided polygon, it cannot be paired. The pair line defined during the third pairing process can be a cutting line for use in dividing the divided polygon into elements. An example of the third pairing process is the projective point P1 corresponding to the vertex B2 shown in FIG. 16(A).

Fourth pairing process: One of the pair data having the corresponding vertex (a vertex from the top surface constituting data 15 if the pair data contain only vertexes from the bottom surface constituting data 14 or a vertex from the bottom surface constituting data 14 if the pair data contain only vertexes from the top surface constituting data 15) of which the vertex has a number closest to its own number is retrieved. The retrieved vertex is registered as the pair data and is paired. The fourth pairing process preferably follows, for example, the first pairing process. An example of the fourth pairing process is the relationship shown by reference numeral 22 in FIG. 18.

Once such pairing is completed, the element extracting process is easier. On the other hand, it is assumed that the voxel cannot be processed depending on the relationship between small changes in shape data and the lengths of voxel sides. In this case, in the example shown in FIG. 3, the bottom surface is changed (step S51), and if the voxel still cannot be processed, then the contraction distance is changed (step S53).

<Element Extracting Process>

Figure 19A:
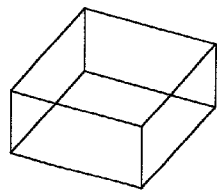
FIGS. 19(A), 19(B), and 19(C) are examples of the shapes of elements that can be used for common analysis solvers.
Figure 19B:
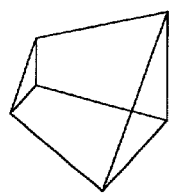
Figure 19C:
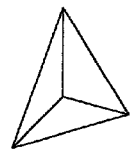

Next, an element extracting process using the pair data will be described. At step S49 (S86 in FIG. 11) shown in FIG. 3, element data are created from an interference polygon and pair data. In this example, elements of three basic shapes as shown in FIGS. 19(A) to (C) and dealt with by many analysis solvers are created.

<Extraction of a Hexahedron>

To create a hexahedron element from pair data, four pairs meeting all the conditions listed below are retrieved from the pair data list.

Figure 19D:
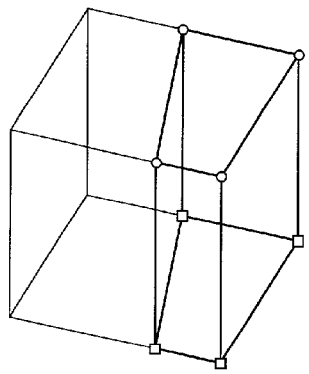
FIG. 19(D) is an explanatory representation showing an example of a hexahedron element to be extracted.

As shown in FIG. 19(D), the four pair numbers (each applied to the corresponding pair line and having a value dependent on the order of scanning of the vertex retrieving line) are continuous (this includes the case where the last number in the list is followed by the first number in the next pair list. This applies to the following description). Four different vertexes from the bottom surface constituting data 14 are contained in the pair. Four different vertexes from the top surface constituting data 15 are contained in the pair. When the vertexes from the bottom surface constituting data 14 are joined together in the order of their numbers, no vertex other than the first and last ones abuts on the diagonal data. When the vertexes from the top surface constituting data 15 are joined together in the order of their numbers, no vertex other than the first and last ones abuts on the diagonal data. In all the pairs, the vertex from the bottom surface constituting data 14 and the vertex from the top surface constituting data 15 both of which are contained in the same pair are different from each other.

Subsequently, a hexahedron is generated using the four retrieved pairs, and it is ascertained that this hexahedron is geometrically established and is not excessively small or distorted. If there is no problem, this hexahedron is registered as element data. Those of the pairs used to create the element which do not have the first or last number are deleted from the pair data list.

<Extraction of a Pentahedron>

To create a pentahedron element from pair data, pairs meeting any of the conditions 1 to 4 described below are retrieved.

Figure 20A:
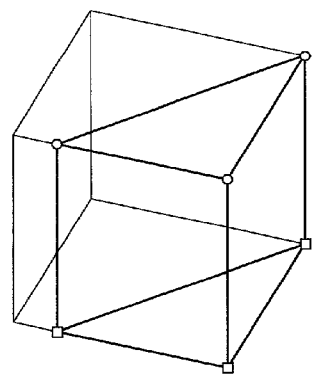
FIGS. 20(A) to (D) are explanatory representations showing an example of a pentahedron element to be extracted.

Condition 1 (FIG. 20(A)): Three pairs have continuous numbers. The three vertexes from the bottom surface constituting data 14 which are contained in the pairs are different from one another. The three vertexes from the top surface constituting data 15 which are contained in the pairs are different from one another. When the vertexes from the bottom surface constituting data 14 are joined together in the order of their numbers, no vertex other than the first and last ones abuts on the diagonal data. In all the pairs, the vertex from the bottom surface constituting data 14 and the vertex from the top surface constituting data 15 both of which are contained in the same pair are different from each other.

Figure 20B:
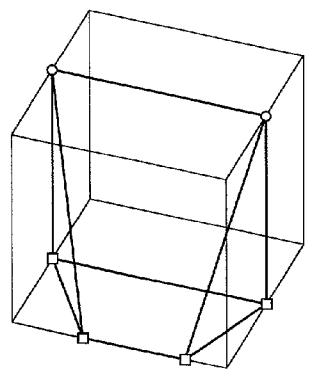

Condition 2 (FIG. 20(B)): Four pairs have continuous numbers. The four vertexes from the bottom surface constituting data 14 which are contained in the pairs are different from one another. The four vertexes from the top surface constituting data 15 which are contained in the pairs are divided into two sets of the two same vertexes each, and the two sets of the same vertexes have continuous numbers. When the vertexes from the bottom surface constituting data 14 are joined together in the order of their numbers, no vertex other than the first and last ones abuts on the diagonal data. In all the pairs, the vertex from the bottom surface constituting data 14 and the vertex from the top surface constituting data 15 both of which are contained in the same pair are different from each other.

Figure 20C:
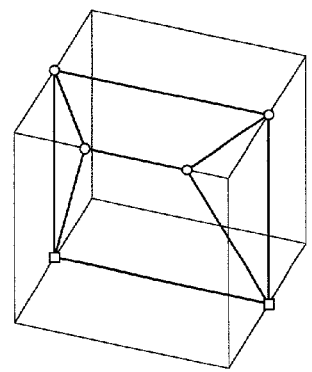

Condition 3 (FIG. 20(C)): Four pairs have continuous numbers. The four vertexes from the top surface constituting data 15 which are contained in the pairs are different from one another. The four vertexes from the bottom surface constituting data 14 which are contained in the pairs are divided into two sets of the two same vertexes each, and the two sets of the same vertexes have continuous numbers. When the vertexes from the top surface constituting data 15 are joined together in the order of their numbers, no vertex other than the first and last ones abuts on the diagonal data. In all the pairs, the vertex from the bottom surface constituting data 14 and the vertex from the top surface constituting data 15 both of which are contained in the same pair are different from each other.

Figure 20D:
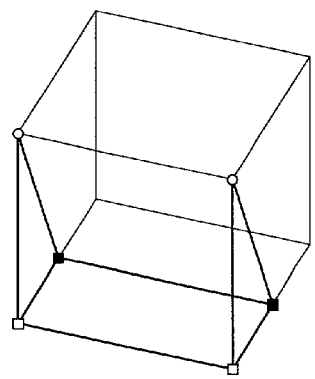

Condition 4 (FIG. 20(D)): Four pairs have continuous numbers. The four vertexes from the bottom surface constituting data 14 which are contained in the pairs are different from one another. The four vertexes from the top surface constituting data 15 which are contained in the pairs are different from one another. In two pairs, the vertex from the bottom surface constituting data 14 is the same as the vertex from the top surface constituting data 15, and these two pairs have continuous numbers.

Subsequently, a pentahedron is generated using the retrieved pairs, and it is ascertained that this pentahedron is geometrically established and is not excessively small or distorted. If there is no problem, this pentahedron is registered as element data. Those of the pairs used to create the element which do not have the first or last number are deleted from the pair data list.

<Extraction of a Tetrahedron>

To create a tetrahedron element from pair data, pairs meeting any of the conditions 1 to 4 described below are retrieved.

Figure 21A:
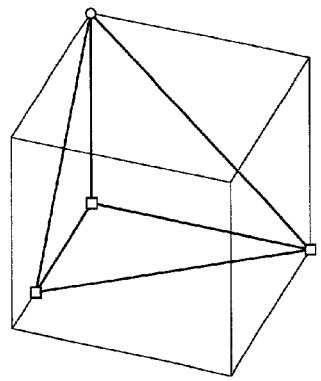
FIGS. 21(A) to (E) are explanatory representations showing an example of tetrahedron element to be extracted.

Condition 1 (FIG. 21(A)): Three pairs have continuous numbers. The three vertexes from the bottom surface constituting data 14 which are contained in the pairs are different from one another. When the vertexes from the bottom surface constituting data 14 are joined together in the order of their numbers, no vertex other than the first and last ones abuts on the diagonal data. The three vertexes from the top surface constituting data 15 which are contained in the pair are the same. In all the pairs, the vertex from the bottom surface constituting data 14 and the vertex from the top surface constituting data 15 both of which are contained in the same pair are different from each other.

Figure 21B:
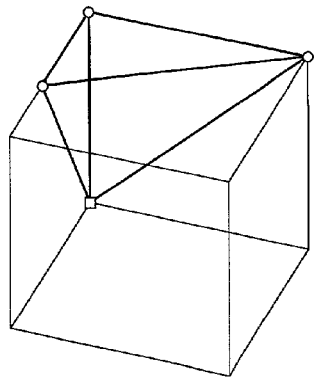

Condition 2 (FIG. 21(B)): Three pairs have continuous numbers. The three vertexes from the top surface constituting data 15 which are contained in the pairs are different from one another. When the vertexes from the top surface constituting data 15 are joined together in the order of their numbers, no vertex other than the first and last ones abuts on the diagonal data. The three vertexes from the bottom surface constituting data 14 which are contained in the pair are the same. In all the pairs, the vertex from the bottom surface constituting data 14 and the vertex from the top surface constituting data 15 both of which are contained in the same pair are different from each other.

Figure 21C:
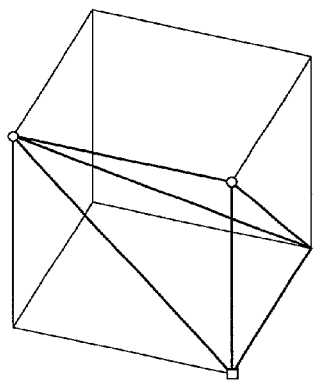

Condition 3 (FIG. 21(C)): Four pairs have continuous numbers. The four vertexes from the bottom surface constituting data 14 which are contained in the pairs are divided into two sets of the two same vertexes each, and the two sets of the same vertexes have continuous numbers. The four vertexes from the top surface constituting data 15 which are contained in the pairs are divided into two sets of the two same vertexes each, and the two sets of the same vertexes have continuous numbers. The vertexes from the top surface constituting data 15 which correspond to the set of the same vertexes from the bottom surface data 14 are different from each other. In all the pairs, the vertex from the bottom surface constituting data 14 and the vertex from the top surface constituting data 15 both of which are contained in the same pair are different from each other.

Figure 21D:
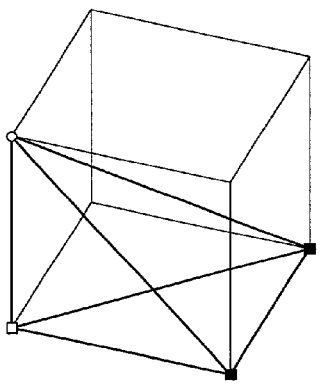
Figure 21E:
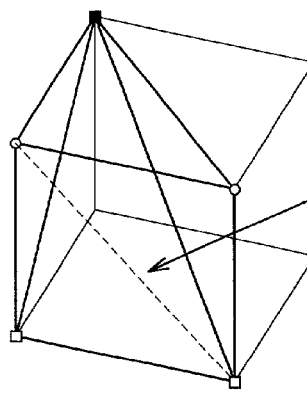

Condition 4 (FIG. 21(D)): Three pairs have continuous numbers. The three vertexes from the bottom surface constituting data 14 which are contained in the pairs are different from one another. The three vertexes from the top surface constituting data 15 which are contained in the pairs are different from one another. In two pairs, the vertex from the bottom surface constituting data 14 is the same as the vertex from the top surface constituting data 15.

Condition 5 (FIG. 21(D)): Three pairs have continuous numbers. The three vertexes from the bottom surface constituting data 14 which are contained in the pairs are different from one another. The three vertexes from the top surface constituting data 15 which are contained in the pairs are different from one another. In one pair, the vertex from the bottom surface constituting data 14 is the same as the vertex from the top surface constituting data 15.

Subsequently, a tetrahedron is generated using the retrieved pairs. At this time, the pairs retrieved under the condition 5 are formed into a pentahedron composed of one rectangular surface and four triangular surfaces, and the rectangle is divided using a diagonal to generate two tetrahedrons. Then, it is ascertained that this tetrahedron is geometrically established and is not excessively small or distorted. If there is no problem, this tetrahedron is registered as element data. Those of the pairs used to create the element which do not have the first or last number are deleted from the pair data list. Whenever one element is generated, data that are not the empty number in the pair data list or the last number are rearranged closely in the order of their numbers, and elements of a hexahedron, a pentahedron, or the tetrahedron are created as described above.

When all the pair data in the pair data list have been used to create elements, that divided polygon has been completely processed. As described above, the divided polygon has such a shape as having, as vertexes, on-side vertexes and voxel vertexes to facilitate the identification of pair data, and pair data are created. Consequently, the element extracting process can be executed under each of the above conditions, thus making it possible to automatically generate elements that properly approximate the shape of even a complicated interference polygon, and improving the analysis accuracy.

Further, if any pair data that are not used to create elements remain in the pair data list, all the elements generated from the voxel in which the interference polygon is present are removed to disable this voxel. At step S50 shown in FIG. 3, possible disabled voxels are retrieved. If any voxel is disabled and has a voxel surface having an internal voxel surface and which is not used as a voxel bottom surface, the procedure shifts to the processing at step S51. Otherwise, the procedure shifts to step S52.

At step S51 shown in FIG. 3, the bottom surface of the disabled voxel has its shape changed. The bottom surface of the disabled voxel is changed, and the divided polygon creating process is executed on this voxel. For example, referring back to FIG. 13, when the internal voxel surface of the processed voxel shown closer to the bottom of FIG. 13(A) is assumed to be the bottom surface, whereas the internal voxel surface shown closer to the top of this figure is assumed to be the top surface, two vertexes from the bottom surface constituting data 14 are present in one pair data. In this case, the voxel may be disabled in order to achieve more proper element extraction. Then, this interference polygon is viewed as shown in FIG. 13(B), and the internal voxel surface of this interference polygon shown closer to the bottom of this figure is assumed to be the bottom surface, whereas the internal voxel surface shown closer to the top of this figure is assumed to be the top surface. When pair data are then retrieved from this polygon, two pentahedron elements can be generated.

At step S52 in FIG. 3, disabled voxels are retrieved. If any voxel is disabled, it is checked whether the vertex contraction distance for this voxel has reached a user input value or a system specified value. If it has not reached the user input value or system specified value, the procedure shifts to the processing at step S53. Otherwise, the procedure shifts to step S54.

At step S53, the shape of the divided polygon of the disabled voxel is simplified. For example, the contraction distance for the disabled voxel is increased, and the voxel is controlled by executing the processing at step S45 and subsequent steps.

For example, the divided polygon in FIG. 22 allows two pentahedrons to be generated as shown in FIGS. 22(B) and (C). The element shown by reference numeral 22, however, has a distorted shape and is not extracted as the element. Then, pair data that are not used to generate elements remain, thereby disabling the process. Thus, the vertex contraction is executed on these pair data as shown in FIG. 22(D). Additionally, if this results in inconsistency with the adjacent voxel, the shape of the interference polygon of the adjacent voxel is changed so as to achieve consistency. Then, the element data dividing process is executed again on the voxel subjected to the vertex contraction and its adjacent voxel. The vertex contraction distance is preferably gradually increased so as to prevent a large difference between the shape data and the shape of an element to be generated.

At step S54 shown in FIG. 3, if any voxel remains disabled in spite of the execution of various processes, the user manually executes the processes to create an element from the interference polygon.

Then, at step S55, nodes are bound. That is, vertexes from the element data (hereafter referred to as "nodes" from the element data) are subjected to multipoint binding. The multipoint binding comprises binding nodes together or binding a node to a side.

Figure 23:
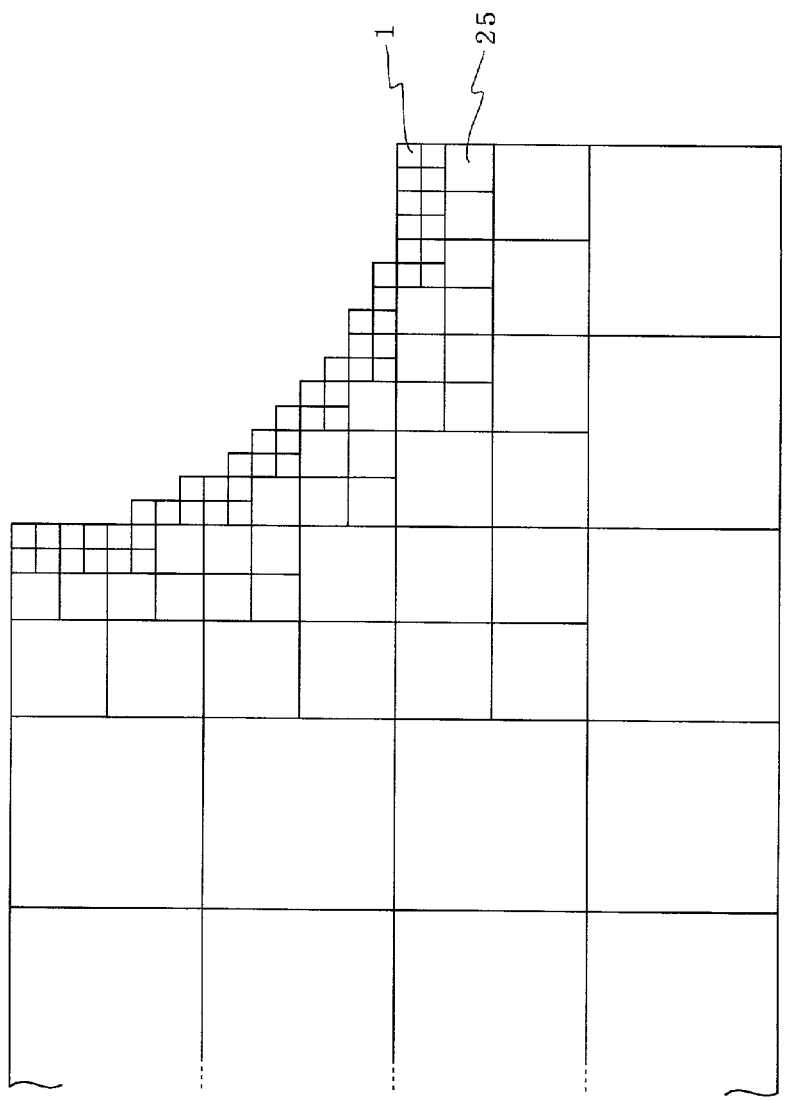
FIG. 23 is an explanatory representation showing an example in which voxel data has an octotree structure.

Further, a desirable example preferably comprises an octotree redefining step of redefining undivided voxels as octotree structures that increase in size step by step toward the inside of a shape to undergo structural analysis, and an intra-octotree node binding step of binding together nodes of voxels redefined at the octotree redefining step. Then, as shown in FIG. 23, the inside of the shape is defined by larger voxels, and in this case, the number of elements of analysis model data can further be reduced.

Figure 24:
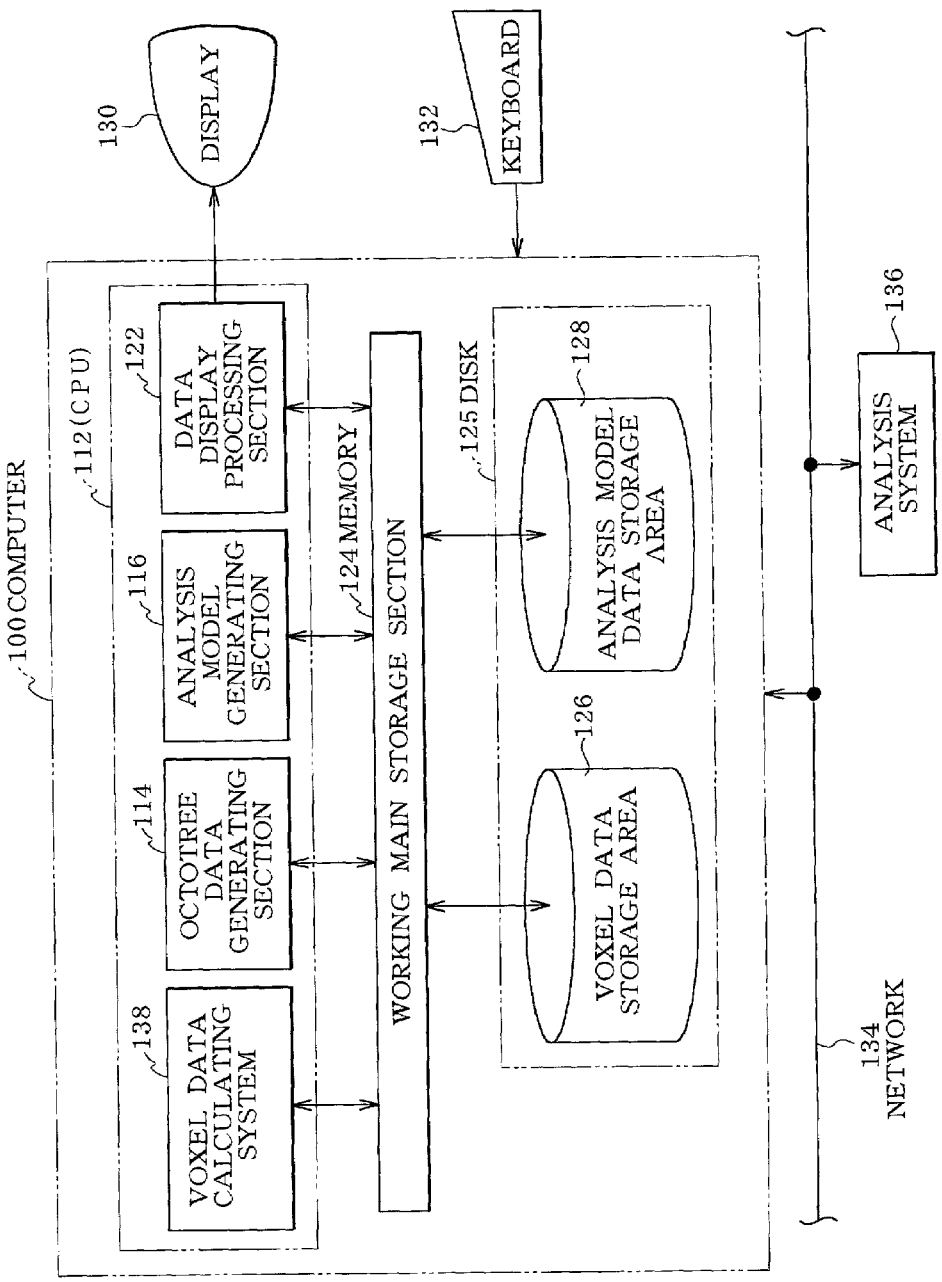
FIG. 24 is a block diagram showing an example of a configuration of an embodiment of an analysis model data creating apparatus according to the present invention.

Next, an analysis model data creating apparatus according to this example will be described. FIG. 24 is a block diagram showing an example of a configuration of the analysis model data creating apparatus. In the example shown in FIG. 24, the analysis model data creating apparatus comprises a CPU 112, a memory 124 acting as a main storage section in which the CPU 112 operates, and a disk 125 on which voxel data and analysis models are stored. The analysis model creating apparatus preferably further comprises a display 130 for displaying voxel data, analysis model data, and analysis results and a keyboard 132 from which various commands to the CPU 112 are input.

The analysis model creating apparatus is also connected to an analysis system 136 via a network 134. A voxel data calculating system 138 divides CAD data or the like into voxels having a minimum size dependent on the accuracy of the analysis, thus generating voxel data. In addition, the user may be requested to input the number of divisions. The analysis system 136 executes structural analysis or fluid analysis on the basis of the analysis model data according to this embodiment, using, for example, the finite element method.

The CPU 112 operates as an analysis model generating section 116 or a data display processing section 122 by executing an analysis model creating program. The operation of the CPU 112 enables the flow charts shown in FIGS. 1 and 3 and other figures to be implemented. An analysis model data creating program for creating analysis model data from CAD data (shape data) using an arithmetic device (computer) comprises a shape data readout instruction to read out shape data defining a surface shape of an analysis target, a voxel data generating instruction to generate voxel data in which the shape data read out by the arithmetic means in response to the shape data readout instruction are embraced by a set of voxels that are rectangular parallellopiped, an interference polygon creating instruction to create, for each voxel interfering with the shape data, an interference polygon inside the shape data using interference surfaces between the shape data and the interior of the voxel, a divided polygon creating instruction to move a vertex of the interference polygon which is not located on any side of the voxel, to an on-side intersection that is an intersection between the interference surface and a side of the voxel, and creating a divided polygon having as vertexes this on-side intersection and vertexes of the voxel inside the shape data, and an element extracting instruction to extract an element of a predetermined shape using a plurality of vertexes of the divided polygon created in response to the divided polygon creating instruction and a voxel surface inside the shape data or a plane which is perpendicular to an internal voxel surface, a partial area of the voxel surface, and which contains the vertexes. The flow charts shown in FIG. 1 and other figures are implemented by executing these instructions by means of the computer 100.

The "instructions to execute something" includes either of both of instructions that operate the arithmetic device (computer) only by themselves and instructions that operate the arithmetic device by relying on other programs such as an operating system which are already stored in the arithmetic device. For example, in the example shown in FIG. 24, the shape data readout instruction causes the computer to read out shape data stored with predetermined names or in predetermined areas. Accordingly, the shape data readout instruction, for example, delivers the name of a file to read out to the operating system in dependence on file input/output function of the operating system. Thus, a storage medium which stores the analysis model creating program and which is used to transport this program to the user may store, for example, only an "instruction to deliver the name of a file to read out to the operating system". The usage of the storage medium depends on the relationship with the operating system or the like of the computer to operate.

The analysis model creating program file is stored in a portable storage media, which is supplied to the computer. This storage media may be a CD-ROM, a floppy disk, or other medium storing data in a non-volatile manner. Additionally, a program from another host apparatus may be supplied to an auxiliary storage device via a communication line.

Further, the analysis model generating means 116 shown in FIG. 24 comprises a shape data readout means for reading out shape data defining a surface shape of an analysis target, a voxel data generating means for generating voxel data in which the shape data read out by the shape data readout means are embraced by a set of voxels which are rectangular parallellopiped, an analysis model data generating means for generating analysis model data from the voxel data generated by the voxel data generating means, and an analysis model data display means for displaying the analysis model data generated by the analysis model data generating means. Furthermore, the analysis model data generating means comprises an interference polygon creating section for creating, for each voxel interfering with the shape data read out by the shape data readout means, an interference polygon inside the shape data using interference surfaces between the shape data and the interior of the voxel, a divided polygon creating section for moving one of the vertexes of the interference polygon which has a predetermined property, to another vertex, and creating a divided polygon having as vertexes the on-side intersection and vertexes of the voxel inside the shape data, and an element extracting section for extracting an element of a predetermined shape on the basis of the relationship between a plurality of vertexes of the divided polygon created by the divided polygon creating section. The operations of these means and sections are identical to those of similar names in the process shown in FIG. 3 and other figures.

Advantages of each process according to this example will be explained below.

1. Advantage Associated with the Contraction of an Intra-surface Vertex or an Intra-voxel Vertex to an on-side Vertex At step S45, an intra-surface vertex or an intra-voxel vertex is contracted to an on-side vertex. When the polygon is composed only of on-side vertexes, pair data can be created more easily at step S47, thus preventing the divergence of the process. Specifically, when the polygon is composed only of the on-side vertexes, the order in which the pair data are arranged can be simply defined to allow all the vertexes to be retrieved in a shorter time than with three-dimensional coordinates.

2. Advantages Associated with the Creation of the Bottom Surface Constituting Data 14 and the Top Surface Constituting Data 15 and with the Creation of Pair Lines Depending on the Relationship Between the Bottom Surface Constituting Data 14 and the Top Surface Constituting Data 15

At step S46, the vertexes of the divided polygon are divided into the bottom surface constituting data 14 and the top surface constituting data 15. Then, a pair line is created depending on whether the target vertex belongs to the bottom surface constituting data 14 or the top surface constituting data 15. If the voxel has a plurality of surfaces interfering with the shape data instead of being cut with a single cutting plane, the divided polygon has an infinite number of shape patterns. It is thus difficult to pattern all the shapes and define element dividing procedures therefor in advance.

The divided polygon of the processed voxel which has been contracted so as to be composed only of on-side vertexes always has one or more internal voxel surfaces (except for the case where the entire shape data is contained in one voxel). On the basis of this property, one of the internal voxel surfaces is selected and defined as a bottom surface and the surface opposite to the bottom surface is defined as a top surface. The correspondences between the vertexes on the bottom surface and the vertexes on the top surface are registered as pair data. Some of the vertexes on the bottom surface and those of the vertexes on the top surface which are paired with these bottom surface vertexes are focused on to create an element.

Even if the divided polygon has a complicated shape, only some of the vertexes on the bottom surface and some of the vertexes on the top surface as well as the pair data corresponding to these vertexes are required to create the element. Thus, the process pattern is limited to enable the element to be automatically created. In this regard, the user may actually desire to use a plurality of surfaces as bottom or top surfaces, so that, exactly speaking, the "bottom surface" as used herein means the "surface defined by the bottom surface constituting data 14", while the "top surface" means the surface defined by the top surface constituting data 15.

3. Advantage Associated with the Simplification of the Shape of a Divided Polygon of a Disabled Voxel At step S50, the shape of a divided polygon of a disabled voxel is simplified. If the divided polygon has a complicated shape, when it is divided into elements, some of these elements are distorted. When such an element is checked, this voxel is disabled. An increase in vertex contraction distance simplifies the shape of the divided polygon to hinder the formation of distorted elements. Consequently, even a disabled voxel can be divided into elements. Gradually increasing the vertex contraction distance enables the divided polygon to be processed while keeping its shape as close to the shape data as possible.

4. Advantage of Preventing the Generation of Fine or Distorted Elements (Steps S42, S45, and S49)

At step S42, if the angle between the interference surfaces is small, these are integrated into one interference surface. Then, at step S45, instead of a voxel vertex, a vertex of the interference polygon which is close to this voxel vertex is moved to the voxel vertex. These processes are executed to prevent the generation of fine or distorted elements. Further, at step S49, it is checked whether or not the element to be generated will be fine or distorted. If the element is determined to be fine or distorted, it will not be generated.

When analysis software is used for analysis, the presence of a fine or distorted element may result in degraded analysis accuracy such as a distorted stress distribution in structural analysis or inaccurate flow fields in fluid analysis. Thus, the generation of fine or distorted elements is excluded at steps S42, S45, and S49 to prevent the analysis accuracy from being degraded.

As described above, according to this example, the difference between the shape data and the voxel for which cutting surfaces are defined is small, so that the shape of the element to be generated is close to the shape data. Further, the cutting surfaces of adjacent voxels are continuous, thus preventing recess and projecting portions from being formed on boundary surfaces from the shape data. This improves the accuracy of an analysis model to be generated, to thereby obtain accurate analysis results.

FIG. 25 is a chart showing results of the application of the analysis model data according to this example to a connecting rod. As shown in FIG. 25, with analysis model data created using the analysis model creating method or apparatus according to this example, the accuracy of specific-frequency analysis is improved though the number of elements required is reduced to half, compared to the conventional method. FIG. 26 shows an example of an analysis model.

Figure 27B:
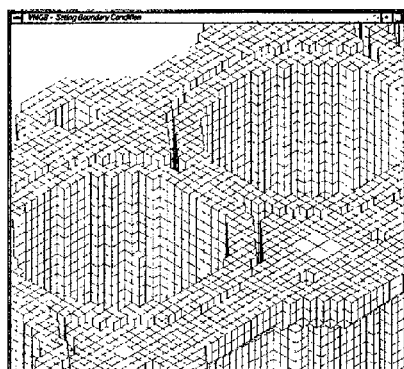
FIG. 27(B) is a partly enlarged view.
Figure 27A:
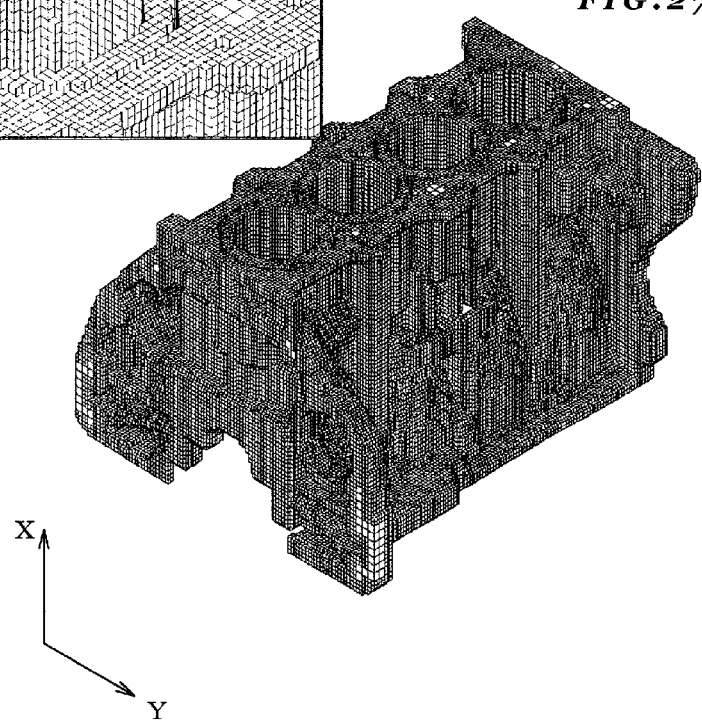
FIG. 27(A) is a view showing the entire data.
Figure 28B:
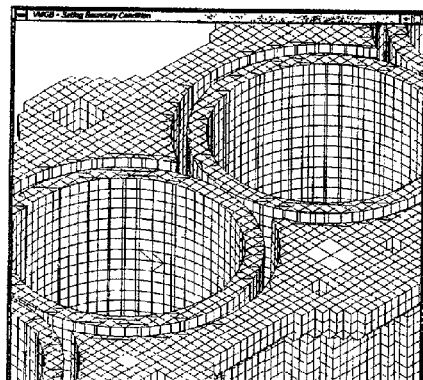
FIG. 28(B) is a partly enlarged view.
Figure 28A:
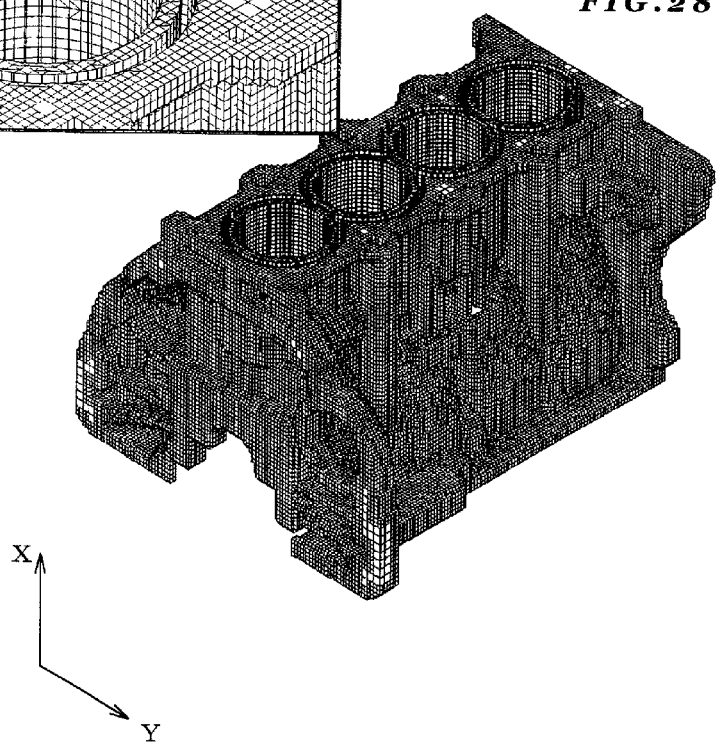
FIG. 28(A) is a view showing the entire data.

FIG. 27 is an explanatory representation showing an example of analysis model data on which a shape fitting operation that extracts elements depending on the interference between shape data and voxel data has not been performed. FIG. 28 is an explanatory representation showing an example of analysis model data on which shape fitting has been executed according to this example. A comparison between the enlarged views indicates that the analysis model data according to this example more accurately approximate the actual shape in circular portions, clearances, or the like.

FIG. 29 is a chart showing results of the application of the analysis model data according to this example to a cylinder block. As shown in FIG. 29, the use of the analysis model creating method according to this example makes it possible to substantially reduce the time required to create an analysis model and to reduce errors.

<Glossary>

The terms that are particularly defined herein are shown below.

Shape data: data on a shape constituting a source of an analysis model. This example uses STL data.

Element: polygon constituting the analysis model. Common analysis solvers (analysis software) allow the use of only a predetermined shape such as a hexahedron.

Voxel data: data obtained by approximating the shape data using a set of rectangular parallelepipeds, or data on these rectangular parallelopipeds as not interfering with the shape data.

Voxel surface: surface constituting a voxel and which is rectangular.

Voxel vertex: vertex of the voxel.

Processed voxel: voxel interfering with the shape data and on which a process is executed to cut off an element.

Interference surface (cutting surface): polygon representing the portion of the shape of the shape data inside the voxel. When, however, vertexes of this polygon are moved at step S45, its shape does not match the shape data.

Internal voxel surface: voxel surface present inside the shape data or a partial area of the voxel surface present inside the shape data.

Interference polygon: polygon formed by combining the interference surface (cutting surface) and the internal voxel surface together. The shape of the interference polygon is substantially the same as the shape data. The interference polygon has as its vertexes on-side intersections (including internal voxel vertexes), intra-surface intersections, and intra-voxel intersections.

On-side intersection: intersection between a surface, a side, or an interior from the shape data and a side of the voxel (which contains a vertex).

Intra-surface intersection: intersection between a side from the shape data and a voxel surface.

Intra-voxel intersection: intersection between a vertex from the shape data and the interior of the voxel.

Each intersection: some or all of the on-side intersections, intra-surface intersections, and intra-voxel intersections.

On-side vertex: point that is both a vertex and an on-side intersection of the intersection polygon. The vertexes of the divided polygon include only on-side vertexes and voxel vertexes.

Intra-surface vertex: point that is both a vertex and an intra-surface intersection of the interference polygon. In one example, the intra-surface vertex is moved to an on-side vertex.

Intra-voxel vertex: point that is both a vertex and an intra-voxel intersection of the interference polygon. In one example, the intra-voxel vertex is moved to an on-side vertex.

Vertex contraction: process for moving or combining vertexes of the interference polygon into one vertex to simplify the shape of the interference polygon.

Divided polygon: polygon obtained by means of the vertex contraction after the intra-surface and intra-voxel vertexes of the interference polygon to the on-side vertexes thereof.

Distorted: distorted element is obtained if the surfaces of the polygon have excessively large aspect ratios or if the element has an excessively large or small height relative to the area of the surface.

Disabled: while an attempt is being made to generate an element from the divided polygon, if the process fails, this polygon is treated "disabled". The disabled state is a temporary process result and does not mean that the processing on this divided polygon is totally disabled. The disabled state occurs in the following cases: first, no pair data can be created. Second, certain pair data are not used to generate the element (this occurs when a distorted or fine element is generated).

Disabled voxel: voxel determined to be disabled.

Interior and exterior determining value: value defined for each intersection to indicate the relationship between the direction of the side on which the intersection sits and the interior and exterior of the shape data. This value includes "+", "−", and "boundary".

Voxel bottom surface: voxel surface used as a reference when an element is cut off from the polygon. The voxel surface is defined for each voxel. Which surface of the voxel is to set as the voxel bottom surface depends on predetermined requirements; the bottom surface is changed as required.

Voxel top surface: voxel surface opposite to the voxel bottom surface (a surface orthogonal to a normal of the voxel bottom surface).

Voxel side surface: voxel surface that is not the voxel bottom surface or the voxel top surface. All or some of four voxel surfaces having a surface parallel with the normal direction of the voxel bottom surface.

Bottom surface: internal voxel surface contained in the voxel bottom surface. The internal voxel surface constitutes part of the divided polygon.

Top surface: surface that constitutes a pair with the bottom surface.

Bottom surface constituting data 14: data indicative of a set of the vertexes belonging to the bottom surface side of the divided polygon if all the vertexes of the divided polygon are divided into the top surface side and the bottom surface side. Alternatively, the bottom surface constituting data are a set of the sides and surfaces on the bottom surface side which are defined by the bottom-surface-side vertexes.

Top surface constituting data 15: data indicative of a set of those of the vertexes of the divided polygon which do not belong to the bottom surface constituting data 14. Alternatively, the top surface constituting data are a set of the sides and surfaces on the top surface side which are defined by the bottom-surface-side vertexes.

Side data: data on those of the sides contained in the bottom surface constituting data 14 or the top surface constituting data 15 which are located on outer peripheries.

Diagonal data: data on those of the sides contained in the bottom surface constituting data 14 or the top surface constituting data 15 which are not contained in the side data.

Vertex retrieving line: line for scanning the outer peripheries of the side data in order to retrieve the position of a vertex of the divided polygon.

Vertex number: numbers sequentially applied to the vertexes of the divided polygon depending on the scanning direction of the vertex retrieving line.

Pair number: number applied to a line corresponding to the vertex retrieving line as arranged at the location where the vertex has been retrieved; this is subsequently used as the number of the corresponding pair.

Pair data list: list containing the one-to-one correspondences between the vertexes contained in the side data of the bottom surface constituting data 14 and the vertexes contained in the side data of the top surface constituting data 15, the correspondences being arranged in the order of predetermined numbers.

Pair data: each data extracted from the pair data list in the order of their numbers.

Pair: those of the pair data which have a correspondence between the bottom surface constituting data 14 and the top surface constituting data 15 are called "pairs".

Node: vertexes from element data.

Since the present invention is configured and functions as described above, the divided polygon creating step comprises generating a divided polygon obtained by simplifying an interference polygon, and the element extracting step comprises extracting an element on the basis of the relationship between a plurality of vertexes of the divided polygon. Accordingly, the element can be extracted after simplifying the shape of the divided polygon depending on the element extracting method. Consequently, even if one voxel contains two or more interference surfaces, the process can be completed without diverging. Further, when, for example, the vertexes of the divided polygon are limited to points on sides of the voxel, the element extracting step comprises defining, for example, a plane perpendicular to one surface of the divided polygon which is set as its bottom surface, on the basis of the relationship between the plurality of vertexes of the divided polygon so that this plane and each vertex can be used to extract an element of a simple shape. Thus, even if the voxel has two or more interference surfaces, an element of an analysis model can be extracted with accuracy dependent on the element extracting method. Consequently, even if the analysis target has a complicated shape, the division of the shape data into elements can be automated while reducing the number of elements required without reducing the analysis accuracy. Therefore, the present invention can provide a more excellent analysis model data creating method than any conventional techniques.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-203853 (Filed on Jul. 5, 2000) including specification, claims, drawings and summary are incorporated herein by reference in its entirety.

What is claimed is:

1. A computer implemented method for creating an analysis model data using an arithmetic device, comprising:
    reading out shape data defining a surface shape of an analysis target;
    generating voxel data in which the read out shape data are embraced by a set of voxels that are rectangular parallelepipeds;
    creating, for each voxel interfering with the read out shape data, an interference polygon inside the shape data using interference surfaces between the shape data and the interior of the voxel;
    moving one of the vertexes of the interference polygon which has a predetermined property, to another vertex and creating a divided polygon having, as vertexes, said vertex that has not been moved and vertexes of the voxel inside said shape data; and
    extracting an element of a predetermined shape on the basis of a relationship between a plurality of vertexes of the divided polygon.

2. The computer implemented method according to claim 1, wherein said creating the divided polygon includes moving vertexes of the interference polygon which are not located on any side of said voxel, to an on-side intersection that is an intersection between said interference surface and a side of said voxel.

3. The computer implemented method according to claim 1, wherein said element extracting includes defining, for element extraction, straight lines between the vertexes of said divided polygon and a surface containing some of the vertexes and parallel with any surfaces of said voxels.

4. The computer implemented method according to claim 1, wherein said element extracting comprises setting a bottom surface and a top surface corresponding to the bottom surface in said divided polygon,
    allotting the vertexes of said divided polygon to the set top surface side and the set bottom surface side,
    identifying correspondences between the vertexes on the top and bottom surface sides which have been allotted, and
    extracting an element of a predetermined shape from the divided polygon using the top and bottom surface sides identified as correspondences.

5. A computer implemented method for creating an analysis model data using an arithmetic device, comprising:
    reading out shape data defining a surface shape of an analysis target;
    generating voxel data in which the read-out shape data are embraced by a set of voxels that are rectangular parallelepipeds; and
    creating, for each voxel interfering with the shape data, an interference polygon inside the shape data using interference surfaces between the shape data and the interior of the voxel;
    after said creating of the interference polygon moving vertexes of the interference polygon which are not located on any side of said voxel, to an on-side intersection that is an intersection between said interference surface and a side of said voxel, and creating a divided polygon having, as vertexes, the on-side intersection and vertexes of the voxel inside said shape data; and
    extracting an element of a predetermined shape using a plurality of vertexes of the divided polygon and a voxel surface inside said shape data or a plane which is perpendicular to an internal voxel surface, or a partial area of the voxel surface, and which contains said plurality of vertexes of the divided polygon.

6. The computer implemented method according to claim 5, wherein said element extracting comprises:
    identifying one internal voxel surface of said divided polygon which has a predetermined property and selling the identified internal voxel surface as a bottom surface;
    identifying a top surface corresponding to the set bottom surface; allotting all the vertexes of said divided polygon to the top surface side and the bottom surface side; and
    defining a plane perpendicular to said internal voxel surface on the basis of a relationship between the vertexes allotted to the bottom and top surfaces.

7. The computer implemented method according to claim 6, wherein said defining the plane comprises:
    generating a vertex retrieving line perpendicular to said bottom surface and scanning the vertex retrieving line on a side of said divided polygon corresponding to said bottom surface thereof;
    applying, if any vertex of said divided polygon is discovered while the vertex retrieving line is being scanned, a pair number to the vertex retrieving line at the position of the discovery;
    generating, after completion of the scanning, pairs of vertexes on the bottom surface side and on the top surface side on the basis of a plurality of lines to which the pair numbers have been applied and of the presence of said vertexes on the bottom surface side and said vertexes on the top surface side for each of the lines;
    setting, if an intersection between said line imparted with the pair number and having a vertex that has not been paired and a side of the divided polygon is inside said shape data, the intersection as a projective point; and
    adding the projective point and a vertex corresponding to the projective point as said pair and defining a plane for element extraction on the basis of a relationship between the paired vertexes.

8. The computer implemented method according to claim 6, wherein said element extracting includes changing the bottom surface of divided polygons from which elements cannot be extracted and retrying the extraction process on the basis of the changed bottom surface.

9. The computer implemented method according to claim 5, wherein said creating of the divided polygon includes contracting the on-side intersection to a vertex of the voxel if a distance from said on-side intersection to said voxel vertex is shorter than a predetermined contraction distance.

10. The computer implemented method according to claim 9, further comprising, after said element extracting, increasing the contraction distance of divided polygons from which elements cannot be extracted and retrying said process for generating a divided polygon, on the basis of the changed contraction distance.

11. The computer implemented method according to claim 5, wherein said element extracting includes executing, if an extracted element has a predetermined distorted shape, a process of not extracting the distorted shape as an element.

12. The computer implemented method according to claim 5, wherein said creating the interference polygon comprises:
    extracting a voxel interfering with said shape data as a processed voxel;

determining a presence of any vertex from the shape data inside the processed voxel to be an intra-voxel intersection determining a presence of any intersection between a surface of said processed voxel and a side of said shape data to be an intra-surface intersection;

determining a presence of any intersection between a side of said processed voxel and a surface of said shape data to be an on-side intersection; and applying an interior and exterior determining value for interior and exterior determination to each of said intra-voxel intersection, said intra-surface intersection, and said on-side intersection on the basis of front and back in formation contained in said shape data.

13. A computer program product embodied on a computer-readable medium and comprising code that, when executed, causes a computer to perform:

reading out shape data defining a surface shape of an analysis target;

generating voxel data in which the shape data read out are embraced by a set of voxels that are rectangular parallelepipeds;

creating, for each voxel interfering with the shape data, an interference polygon inside the shape data using interference surfaces between the shape data and the interior of the voxel;

moving a vertex of the interference polygon which is not located on any side of said voxel, to an on-side intersection that is an intersection between said interference surface and a side of said voxel;

creating a divided polygon having, as vertexes, the on-side intersection and vertexes of the voxel inside said shape data; and extracting an element of a predetermined shape using a plurality of vertexes of the divided polygon and a voxel surface inside said shape data or a plane which is perpendicular to an internal voxel surface, or a partial area of the voxel surface, and which contains said plurality of vertexes of the divided polygon.

14. A computing apparatus for creating analysis model data, comprising:

a shape data readout device that reads out shape data defining a surface shape of an analysis target;

a voxel data generator that generates voxel data in which the shape data read out by the shape data readout device are embraced by a set of voxels which are rectangular parallelepiped;

an analysis model data generator that generates analysis model data from the voxel data generated by the voxel data generator; and an analysis model data display that displays the analysis model data generated by the analysis model data generator, wherein said analysis model data generator comprises an interference polygon creator that creates, for each voxel interfering with the shape data read out by said shape data readout device, an interference polygon inside the shape data using interference surfaces between the shape data and the interior of the voxel, a divided polygon creator that moves one of the vertexes of said interference polygon which has a predetermined property, to another vertex, and creates a divided polygon having, as vertexes, the on-side intersection and vertexes of the voxel inside said shape data, and an element extractor that extracts an element of a predetermined shape on the basis of a relationship between a plurality of vertexes of the divided polygon created by the divided polygon creating section.

* * * * *